( 12 ) United States Patent
Okabe et al.

(10) Patent No.: US 7,103,183 B2
(45) Date of Patent: Sep. 5, 2006

(54) ELECTRONIC DEVICE AND PRODUCTION METHOD THEREFOR

(75) Inventors: Yoshimasa Okabe, Niihama (JP); Mitsuaki Omichi, Toyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 991 days.

(21) Appl. No.: 10/019,189

(22) PCT Filed: Apr. 19, 2001

(86) PCT No.: PCT/JP01/03376

§ 371 (c)(1),
(2), (4) Date: Dec. 20, 2001

(87) PCT Pub. No.: WO01/82062

PCT Pub. Date: Nov. 1, 2001

(65) Prior Publication Data

US 2003/0101354 A1  May 29, 2003

(30) Foreign Application Priority Data

Apr. 25, 2000  (JP) ............................. 2000-124913

(51) Int. Cl.
*G09C 1/00* (2006.01)
(52) U.S. Cl. ...................................................... 380/59
(58) Field of Classification Search ................ 439/152; 257/620; 380/28, 59
See application file for complete search history.

(56) References Cited

U.S. PATENT DOCUMENTS 6,282,651 B1 * 8/2001 Ashe .......................... 713/193

6,365,833 B1 * 4/2002 Eng et al. .................. 174/52.2

FOREIGN PATENT DOCUMENTS

| JP | 63-223850 A | 9/1988 |
| JP | 63-276147 A | 11/1988 |
| JP | 64-25354 A | 1/1989 |
| JP | 06045998 A | 2/1994 |

OTHER PUBLICATIONS

Shandle "The Silent Advantage", Electronics, Dec. 1991, pp. 30 and 32, obtained from http://proquest.umi.com/pqdweb?did=1628860&sid=2&Fmt=2&clientId=19649&RQT=309&VName=PQD.*

* cited by examiner

*Primary Examiner*—Emmanuel L. Moise
*Assistant Examiner*—Jeffrey Popham
(74) *Attorney, Agent, or Firm*—Akin Gump Strauss Hauer & Feld, LLP

(57) ABSTRACT

An electronic apparatus that allows data to be written efficiently to an EEPROM with provisions made to greatly reduce the risk of the data stored in the EEPROM being altered in the field, and a production method for the same are achieved. The method is the production method for the electronic apparatus which comprises a board having a separable region and mounted with a central processing unit, an electrically alterable nonvolatile storage device, and a connector mounted on the separable region, and is configured so that when the region is separated, data cannot be written to the storage device by directly controlling an internal circuit of the central processing unit, and the production method for the electronic apparatus comprises: a writing step of writing data to the storage device by connecting an external apparatus to the connector and by directly controlling an internal logic circuit of the central processing unit; and a separating step of separating the region after the writing step.

7 Claims, 8 Drawing Sheets

ELECTRONIC DEVICE AND PRODUCTION METHOD THEREFOR

TECHNICAL FIELD

The present invention relates to an electronic apparatus that is controlled by a central processing unit compliant with the IEEE std 1149.1-1990 Standard Test Access Port and Boundary-Scan Architecture and the like, and more particularly to the prevention of illegal alteration of data stored in a storage device (data including an operating program for the central processing unit, cryptographic keys, customer identifiers (user ID codes), etc.).

BACKGROUND ART

Today, many electronic apparatuses such as information apparatuses and household appliances use central processing units (hereinafter referred to as CPUs) as units central to their control systems, and to control an electronic apparatus with the CPU, a program for operating the CPU is indispensable. Depending on the kind of CPU, the CPU can store the program internally in itself, but in most cases, for reasons of development efficiency, production efficiency and maintenance of the electronic apparatus, a read only memory (hereinafter referred to as ROM) is provided externally to the CPU and the program is stored in the ROM.

Data such as cryptographic keys (including a decryption key), customer identifiers or the like may also be stored in the ROM.

The ROM is a nonvolatile storage device, and the ROM of the type that allows stored information to be altered only by electrical signals (hereinafter referred to as EEPROM, whose examples include a flash memory, an electrically erasable and programmable ROM, etc.) is mainly used.

The "nonvolatile storage device" refers to a device that can retain its stored contents even when power is turned off.

Storing data (including CPU program, codes such as customer identifiers, decryption keys, etc. and the like) in the EEPROM offers the advantage of increasing production efficiency and making it possible to alter the data (including the CPU program, etc) for the maintenance of the electronic apparatus because the stored data can be easily altered. On the other hand, the disadvantage is that, since the specifications for the EEPROM is made public, a malicious third party could alter the program illegally, causing damage to not only the manufacturer of the electronic apparatus but also the society as a whole.

In particular, if the CPU is a device compliant with the IEEE 1149 standard, there is the possibility that an unauthorized person may connect an external apparatus to the CPU and alter the data stored in the EEPROM by directly controlling the internal logic circuit of the CPU through the external apparatus.

The IEEE 1149 standard is a standard for test circuits of semiconductor devices (including large scale integrated circuit and central processing unit). A device (semiconductor device) compliant with the IEEE 1149 standard has five test input/output terminals (Test Access Port) for testing of the device itself or for testing of the circuit block containing the device (to test mainly for judging the presence or absence of a fault and locating a faulty part).

To test the device, etc., an external apparatus, for example, is connected to a test input terminal of the device, and a test input signal is applied from the external apparatus to the test input terminal, causing the input signal or a signal obtained by processing the input signal to be outputted from the device's output terminal (an ordinary output terminal or a test output terminal). The presence or absence of a fault and the location of a faulty part can be detected by comparing the output signal with the expected signal.

It is also possible to connect an external apparatus to the test input/output terminals of the IEEE 1149 standard compliant CPU and to write data to the EEPROM by directly controlling the internal logic circuit of the CPU through the external apparatus.

By incorporating the step of writing data to the EEPROM by the above method into the production of an electronic apparatus, the more efficient production of the electronic apparatus can be realized, compared with the conventional method in which data is written to the EEPROM by using a commercially available PROM writer.

This, however, may give rise to illegal alteration of the data; that is, by abusing the above feature, an unauthorized person may connect an external apparatus to the input/output terminals of the IEEE 1149 compliant CPU in the field and alter the data stored in the EEPROM by directly controlling the internal logic circuit of the CPU through the external apparatus.

For example, in satellite broadcasting, etc., unique data may be assigned to each customer, in which case the receiver or like apparatus can store the assigned data in its internal EEPROM.

The unique data includes a customer identifier (including the unique identification code assigned to each customer and the unique identification code assigned to each receiver at the customer), a decryption key, and an identification number.

The CPU pays a monthly viewing fee by using the unique data (for example, the customer identifier) stored in the EEPROM. However, there is the possibility that criminal act may be made to evade paying viewing fees, for example, by altering the unique data stored in the EEPROM to someone else's unique data or by altering the program written in the EEPROM (for example, by writing a program therein such that a report is sent to the broadcast center that the viewing time is zero regardless of the actual viewing time).

To prevent such criminal act, there is a need for means that prevents illegal alteration (rewriting) of the data (including the CPU program, etc.) stored in the EEPROM.

A prior art electronic apparatus equipped with means for preventing data in an EEPROM from being altered illegally will be described with reference to FIG. 6.

The use of the electronic apparatus shown in FIG. 6 is not specifically limited, but the apparatus is applied, for example, to a satellite broadcast receiver, a portable telephone, or the like. FIG. 6 shows only the block relating to writing data to or reading data from the EEPROM.

In FIG. 6, reference numeral 107 designates the CPU which controls the electronic apparatus, 8 designates the EEPROM in which data such as the CPU program, etc. are stored, 101 designates an electrical or optical connector for connecting an external apparatus (not shown) used to rewrite the program, 102 designates an interface to which signals applied via the connector 101 are inputted. Reference numeral 105 designates a storage device (hereinafter referred to as the password ROM) which holds therein the identification number unique to the electronic apparatus and is mounted in a such manner that it cannot be removed by solder or the like, and in which the stored data cannot be altered. Reference numeral 104 designates a comparing circuit which compares the identification number inputted via the connector 101 and interface 102 with the identification number stored in the password ROM, and outputs a program rewrite permit signal only when they match. Reference numeral 103 designates a gate circuit which controls the passing of the rewrite control signal and program data to the EEPROM 8.

Next, the program rewrite operation will be described. When it becomes necessary to rewrite the program stored in the EEPROM 8, a program rewriting apparatus (external apparatus) is connected to the connector 101. An identification number, a new program, and control instructions necessary for rewriting the EEPROM are stored in the program rewriting apparatus. First, a program rewrite start instruction is inputted from the program rewriting apparatus, whereupon the CPU 107, etc. stop the normal operation and the data stored in the EEPROM 8 thus becomes ready for rewriting by this instruction.

Next, the comparing circuit 104 compares the identification number inputted via the interface 102 from the program rewriting apparatus with the identification number read out of the password ROM 105. Only when the two identification numbers perfectly match, the comparing circuit 104 outputs the program rewrite permit signal to the gate circuit 103. In accordance with the program rewrite permit signal, the gate circuit 103 allows the rewrite control signal and program data inputted via the interface 102 to be passed to the EEPROM 8. The program in the EEPROM 8 is rewritten. When the program rewrite operation is completed, the program rewriting apparatus sends a rewrite completion instruction to the CPU 107 via the interface 102. The CPU 107, based on the instruction, initializes the electronic apparatus, and starts the control of the electronic apparatus in accordance with the new program stored in the EEPROM 8.

In recent years, however, CPUs compliant with the IEEE std 1149.1-1990 Standard Test Access Port and Boundary-Scan Architecture (hereinafter referred to by its commonly known name "JTAG standard") have come to be used. When the CPU is a JTAG standard compliant device, the prior art prevention system of illegal program alteration cannot provide effective prevention means because the program stored in the EEPROM 8 can be altered via the CPU by directly controlling the internal logic circuit of the CPU from the outside.

A system using a JTAG compliant device for the CPU and the configuration of the JTAG compliant device will be briefly described with reference to FIGS. 7 and 8.

FIG. 8 is a diagram showing the configuration of the JTAG standard compliant device, in which reference numeral 1 designates the JTAG standard compliant CPU (hereinafter referred to the J-CPU as distinguished from the conventional CPU), 2 designates an internal logic circuit responsible for the essential operations specific to the device, and 3 designates terminals for normal operation (usually connected to terminals, etc. of other devices). The terminals 7 consisting of TDI (test data input pin), TMS (test mode select pin), TCK (test clock), TDO (test data output pin) and TRST (power-on reset pin) are test terminals, collectively called the Test Access Port (hereinafter referred to TAP), that are provided based on the JTAG standard (TRST is optional). The TAP is an interface for connecting an external apparatus to the test circuit.

The JTAG standard compliant device contains JTAG registers 5 including a bypass register, instruction register, etc. (as options, an internal scan register and an ID CODE register may be included), a TAP controller 6 for controlling the JTAG registers 5, and cells 4 as a shift register arranged between each terminal 3 and the internal logic circuit 2.

The cell 4 selects for inputting the output data of the internal logic circuit 2 (including input terminals 3 of the J-CPU 1) or the test data transferred from its adjacent cell 4. The output data of the cell 4 is transferred to the internal logic circuit 2 (including output terminals 3 of the J-CPU 1) or to its adjacent cell 4.

During normal operation (not in a test mode), the input data inputted via the input terminals 3 of the J-CPU 1 are passed through the respective cells 4 and transferred to the internal logic circuit 2 as it is, and the output data of the internal logic circuit 2 are passed through the respective cells 4 and outputted from the output terminals 3 of the J-CPU 1 as it is.

In the test mode, instead of the input data inputted via the input terminals, signals inputted via the TAP 7 can be transferred into the internal logic circuit 2 via the cells 4. Further, instead of the output data of the internal logic circuit 2, signals inputted via the TAP 7 can be outputted from the output terminals 3 via the cells 4.

The TAP controller 6 controls various operations of the entire test circuit in accordance with the input sequence inputted via the TMS pin.

The JTAG standard compliant device allows the signals passing through the respective cells 4 (the input/output signals of the respective terminals 3) to be monitored by the external apparatus connected to the TAP 7, and also allows arbitrary data to be inputted to the internal logic circuit 2.

For example, test input data transmitted from the external apparatus is applied to the TDI terminal and the serial shift register consisting of the plurality of cells 4 is driven in serial fashion (clock signal is applied to the TCK terminal). In this way, the test input data is transferred to the respective cells 4. Next, the output data of each cell 4 is transferred to the internal logic circuit 2 (including output terminals 3 of the J-CPU 1). In this way, the test input data can be inputted directly to the internal logic circuit 2 (including the output terminals 3 of the J-CPU 1).

Likewise, the output data of the internal logic circuit 2 (including the input terminals 3 of the J-CPU 1) are latched into the respective cells 4 and the serial shift register consisting of the plurality of cells 4 is driven in serial fashion; in this way, the output data can be outputted from the TDO terminal.

That is, by connecting an external apparatus to the J-CPU 1 and controlling a maximum of five signal lines, the internal logic circuit 2 of the J-CPU 1 can be controlled directly from the external apparatus. This offers the advantage of facilitating the testing of the electronic apparatus or a device such as the J-CPU 1.

FIG. 7 is a diagram showing the electronic apparatus system using the J-CPU 1; in FIG. 7, reference numeral 9 designates a JTAG connector for connecting the TAP 7 of the J-CPU 1 to an external apparatus, 108 designates a RAM (a readable/writable storage device for storing data, etc. that need to be temporarily stored to operate the electronic apparatus), and 110 designates a signal bus (hereinafter referred to as the bus) connecting the EEPROM 8, RAM 108, etc. to the J-CPU. Besides the EEPROM 8 and RAM 108, a plurality of devices designated by 109 can be connected to the bus 110. An actual circuit contains many other electronic components, but they will not be described here.

Since the internal logic circuit of the J-CPU can be directly controlled from the outside by connecting an external apparatus called a JTAG debugger to the J-CPU, thereby making it possible to access all the devices including the EEPROM where the program and other data are stored, the prior art electronic apparatus using the J-CPU has had the advantage of being able to increase development efficiency and reduce the time required for testing and program writing during the production process.

This, however, has lead to the problem that using a JTAG debugger, a third party could illegally alter the data stored in the EEPROM in the prior art electronic apparatus.

It is an object of the present invention to achieve a production method that can produce an electronic apparatus efficiently, while making provisions to greatly reduce the risk of the data stored in the EEPROM in the completed electronic apparatus being altered in the field.

It is also an object of the present invention to achieve an electronic apparatus that can be produced efficiently, while making provisions to greatly reduce the risk of the data stored in the EEPROM being altered in the field.

DISCLOSURE OF INVENTION

The invention described in one embodiment concerns a production method for an electronic apparatus comprising a board having a separable region, the board being mounted with a central processing unit, an electrically alterable nonvolatile storage device, and a connector mounted on the region, wherein when the region is separated, data cannot be written to the storage device by directly controlling an internal circuit of the central processing unit, the production method comprising: a writing step of writing data to the storage device by connecting an external apparatus to the connector and by directly controlling an internal logic circuit of the central processing unit; and a separating step of separating the region from the board after the writing step.

In the electronic apparatus production method of the present invention, data (including program, etc.) is written to the EEPROM efficiently by directly controlling the internal logic circuit of the CPU through the external apparatus (for example, JTAG debugger), and after that, the region mounted with the connector is separated.

According to the present invention, when producing the electronic apparatus at the factory, data (including program, etc.) can be written to the EEPROM efficiently and detection of a faulty part, etc. can also be carried out quickly and accurately by directly controlling the internal circuit of the CPU (for example, J-CPU) through the external apparatus such as a JTAG debugger. After completing the data write to the EEPROM, the region mounted with the connector is separated so that a third party cannot illegally alter the data of the internal EEPROM in the field by connecting an external apparatus such as a JTAG debugger to the electronic apparatus.

Writing to the EEPROM may also be rendered impossible, for example, by removing a resistive element from the board, but this method has the problem that if a third party knows this fact, the third party can easily rewrite the EEPROM by soldering another resistive element. By contrast, if the third party knows that the above region of the board has been separated, it is extremely difficult to actually fix the board and make writing to the EEPROM possible.

The present invention thus offers the effect of achieving a production method that can produce an electronic apparatus efficiently, while making provisions to greatly reduce the risk of the data stored in the EEPROM in the completed electronic apparatus being altered in the field.

The kind, use, etc. of the "electronic apparatus" are not specifically limited. Applications include, for example, receivers for satellite broadcast or other broadcast systems, home electronic apparatuses such as portable telephones, and industrial electronic apparatuses such as copying machines.

The "separable region" means a region that can be separated from the board by any suitable method. For example, a V-shaped groove is cut in one surface or both surfaces of the board, and the region is cut off along the groove by applying an external stress to the board. In another example, many through-holes or the like are opened along the boundary of the region to be separated so that the region can be separated along the boundary.

A separable region that can be cut off along the boundary by shearing is also an example. In this case, the basic requirements for the "separable" region are that there be no components on the boundary, and that the board operate properly after the region has been separated along the boundary.

The phrase "directly controlling the internal circuit of the central processing unit" means that the CPU is controlled by a method other than that a normal program (software) operation. An example is to directly control a J-CPU compliant with the JTAG standard through the TAP.

The phrase also refers to the case where a CPU containing a scan design circuit is directly controlled through the scan design circuit.

The phrase further refers to the case where a CPU containing a cross check circuit is directly controlled through the cross check circuit (probe line driver and sense line receiver).

However, it does not include the case where data is transferred between a CPU operating under usual software and an external apparatus through a handshake or like procedure.

The phrase "when the region is separated, data cannot be written to the storage device by directly controlling the internal circuit of the central processing unit" means, for example, that the internal circuit of the central processing unit cannot be directly controlled by using a connector other than the connector separated from the board.

The "data" includes a program for operating the central processing unit, cryptographic keys, a customer identifier (user ID code), and an identification number.

The invention described in one embodiment concerns a production method for an electronic apparatus comprising a board having a separable region, the board being mounted with a central processing unit, an electrically alterable nonvolatile storage device, a connector, a relaying device for connecting at least one terminal of the connector to at least one terminal of the central processing unit, and a detection device for detecting whether the region is separated or not, wherein when the region is separated, the relaying device, based on an output signal from the detection device, disconnects at least one connecting line connecting the terminal of the connector to the terminal of the central processing unit so that data cannot be written to the storage device by directly controlling an internal circuit of the central processing unit, the production method comprising: a writing step of writing data to the storage device by connecting an external apparatus to the connector and by directly controlling an internal logic circuit of the central processing unit; and a separating step of separating the region after the writing step.

In the electronic apparatus production method of the present invention, data (including program, etc.) is written to the EEPROM efficiently by directly controlling the internal logic circuit of the CPU through the external apparatus (for example, JTAG debugger), and after that, the region is separated.

According to the present invention, when producing the electronic apparatus at the factory, data (including program, etc.) can be written to the EEPROM efficiently and detection of a faulty part, etc. can also be carried out quickly and accurately by directly controlling the internal circuit of the CPU (for example, J-CPU) through the external apparatus such as a JTAG debugger. After completing the data write to the EEPROM, the region is separated so that a third party cannot illegally alter the data of the internal EEPROM in the field by connecting an external apparatus such as a JTAG debugger to the electronic apparatus.

Even if the third party knows that the above region of the board has been separated, it is extremely difficult to actually fix the board and make writing to the EEPROM possible.

The present invention thus offers the effect of achieving a production method that can produce an electronic apparatus efficiently, while making provisions to greatly reduce the risk of the data stored in the EEPROM in the completed electronic apparatus being altered in the field.

The relaying device disconnects the connecting line connecting, for example, between the TDI terminal of the JTAG compliant CPU and the terminal of the connector; as a result, data cannot be written to the storage device by connecting an external apparatus such as a JTAG debugger to the connector and directly controlling the internal circuit of the central processing unit.

The invention described in one embodiment concerns a production method for an electronic apparatus comprising a board having a separable region, the board being mounted with a central processing unit, an electrically alterable nonvolatile storage device, a connector, a relaying device for connecting at least one terminal of the connector to at least one terminal of the central processing unit, a scrambling device, and a detection device for detecting whether the region is separated or not, wherein: when the region is not separated yet, data read out of the storage device can be descrambled by the scrambling device and the descrambled data can be transferred to the central processing unit, and by connecting an external apparatus to the connector and directly controlling an internal logic circuit of the central processing unit, the central processing unit can be caused to output data to the scrambling device and the scrambling device can scramble the output data of the central processing unit and write the scrambled data to the storage device; and when the region is separated, data read out of the storage device can be descrambled by the scrambling device and the descrambled data can be transferred to the central processing unit, but the scrambling device cannot write data to the storage device based on an output signal of the detection device, the production method comprising: a writing step in which by connecting the external apparatus to the connector and directly controlling the internal logic circuit of the central processing unit, the central processing unit is caused to output data to the scrambling device, and in which the scrambling device scrambles the output data of the central processing unit and writes the scrambled data to the storage device; and a separating step of separating the region after the writing step.

In the electronic apparatus production method of the present invention, data (including program, etc.) is written to the EEPROM efficiently by directly controlling the internal logic circuit of the CPU through the external apparatus (for example, JTAG debugger), and after that, the region is separated thereby preventing the EEPROM from being rewritten.

According to the present invention, when producing the electronic apparatus at the factory, data (including program, etc.) can be written to the EEPROM efficiently and detection of a faulty part, etc. can also be carried out quickly and accurately by directly controlling the internal circuit of the CPU (for example, J-CPU) through the external apparatus such as a JTAG debugger. After completing the data write to the EEPROM, the region is separated so that a third party cannot illegally alter the data of the internal EEPROM in the field by connecting an external apparatus such as a JTAG debugger to the electronic apparatus.

Even if the third party knows that the above region of the board has been separated, it is extremely difficult to actually fix the board and make writing to the EEPROM possible.

Since the third party does not know the method of scrambling, the third party cannot illegally modify the electronic apparatus by removing the EEPROM and trying to rewrite the data using a PROM writer or the like.

The present invention thus offers the effect of achieving a production method that can produce an electronic apparatus efficiently, while making provisions to greatly reduce the risk of the data stored in the EEPROM in the completed electronic apparatus being altered in the field.

Any suitable method may be employed to prevent data from being written to the storage device. For example, it can be accomplished by disconnecting the line connecting between the J-CPU and the EEPROM. All the lines may be disconnected or, for example, only the write strobe signal line may be disconnected. Alternatively, the chip select terminal of the EEPROM may be disabled.

The invention described in claim 1 concerns a production method for an electronic apparatus comprising a board having a separable region, the board being mounted with a central processing unit, an electrically alterable nonvolatile storage device, a connector, a scrambling device, and a detection device for detecting whether the region is separated or not, wherein: when the region is not separated yet, data read out of the storage device can be descrambled with a first scrambling pattern by the scrambling device and the descrambled data can be transferred to the central processing unit, and by connecting an external apparatus to the connector and directly controlling an internal logic circuit of the central processing unit, the central processing unit can be caused to output data to the scrambling device and the scrambling device can scramble the output data of the central processing unit with the first scrambling pattern and write the scrambled data to the storage device; and when the region is separated, then based on an output signal of the detection device, data read out of the storage device can be descrambled with the first scrambling pattern by the scrambling device and the descrambled data can be transferred to the central processing unit, and by connecting the external apparatus to the connector and directly controlling the internal logic circuit of the central processing unit, the central processing unit can be caused to output data to the scrambling device and the scrambling device can scramble the output data of the central processing unit with a second scrambling pattern and write the scrambled data to the storage device, the production method comprising: a writing step in which by connecting the external apparatus to the connector and directly controlling the internal logic circuit of the central processing unit, the central processing unit is caused to output data to the scrambling device, and in which the scrambling device scrambles the output data of the central processing unit with the first scrambling pattern and writes the scrambled data to the storage device; and a separating step of separating the region after the writing step.

In the electronic apparatus production method of the present invention, data (including program, etc.) is written to the EEPROM efficiently by directly controlling the internal logic circuit of the CPU through the external apparatus (for example, JTAG debugger), and after that, the region is separated thereby making it difficult to rewrite the EEPROM.

According to the present invention, when producing the electronic apparatus at the factory, data (including program, etc.) can be scrambled with the first scrambling pattern and written to the EEPROM efficiently and detection of a faulty part, etc. can also be carried out quickly and accurately by directly controlling the internal circuit of the CPU (for example, J-CPU) through the external apparatus such as a JTAG debugger. After completing the data write to the EEPROM, the region is separated thereby making it difficult for a third party to illegally alter the data of the internal EEPROM in the field by connecting an external apparatus such as a JTAG debugger to the electronic apparatus.

Even if the third party knows that the above region of the board has been separated, it is extremely difficult to actually fix the board and make writing to the EEPROM possible.

Since the third party does not know the first scrambling pattern, the third party cannot remove the EEPROM from the board and write data directly to the EEPROM using a PROM writer or the like.

Even if the third party connects an external apparatus to the product in the field and tries to write data from the external apparatus into the storage device by directly controlling the internal logic circuit of the central processing unit, the scrambling device scrambles the output data of the central processing unit with the second scrambling pattern and writes the scrambled data to the storage device. Since the scrambling device reads data from the storage device and descrambles the data with the first scrambling pattern, the electronic apparatus does not operate with the illegally altered data.

Preferably, when a secret operation is performed (for example, a second region is separated from the board or a specified resistive element is removed), the scrambling device descrambles data with the second scrambling pattern.

If, for some reason, it becomes necessary to alter the data stored in the EEPROM, data inputted from the external apparatus can be written to the storage device by connecting the external apparatus to the product and directly controlling the internal logic circuit of the central processing unit. In that case, the data is scrambled with the second scrambling pattern and written to the storage device, but when the secret operation is performed, the scrambling device descrambles the data with the second scrambling pattern so that the electronic apparatus operates normally.

The present invention thus offers the effect of achieving a production method that can produce an electronic apparatus efficiently, while making provisions to greatly reduce the risk of the data stored in the EEPROM in the completed electronic apparatus being altered in the field.

The invention also offers the effect of achieving a production method for an electronic apparatus wherein the data stored in the EEPROM in the completed electronic apparatus can be altered at a later time.

The invention described in one embodiment concerns the electronic apparatus production method described in any one of certain other embodiments, wherein the central processing unit is an IEEE 1149 standard compliant device.

According to the IEEE 1149 standard compliant device, the internal logic circuit of the CPU can be controlled directly by connecting the external apparatus to the TAP.

The present invention thus offers the effect of achieving an efficient production method for an electronic apparatus wherein data is recorded in the EEPROM by using circuitry compliant with the IEEE 1149 standard, and wherein the risk of the data stored in the EEPROM in the completed electronic apparatus being altered in the field is greatly reduced.

The IEEE 1149 standard refers to the IEEE std 1149.1-1990 Standard Test Access Port and Boundary-Scan Architecture and its revised versions (including future revisions).

The invention described in one embodiment concerns an electronic apparatus comprising a board having a separable region, the board being mounted with a central processing unit, an electrically alterable nonvolatile storage device, and a connector mounted on the region, wherein when the region is not separated yet, data can be written to the storage device by connecting an external apparatus to the connector and directly controlling an internal logic circuit of the central processing unit, and when the region is separated, data cannot be written to the storage device by controlling the central processing unit.

According to the electronic apparatus of the present invention, data (including program, etc.) can be written to the EEPROM efficiently by directly controlling the internal logic circuit of the CPU through the external apparatus (for example, JTAG debugger) and, by thereafter separating the region mounted with the connector, the data stored in the EEPROM can be prevented from being altered.

According to the present invention, when producing the electronic apparatus at the factory, data (including program, etc.) can be written to the EEPROM efficiently and detection of a faulty part, etc. can also be carried out quickly and accurately by directly controlling the internal circuit of the CPU (for example, J-CPU) through the external apparatus such as a JTAG debugger. After completing the data write to the EEPROM, the region mounted with the connector is separated so that a third party cannot illegally alter the data of the internal EEPROM in the field by connecting an external apparatus such as a JTAG debugger to the electronic apparatus.

Even if the third party knows that the above region of the board has been separated, it is extremely difficult to actually fix the board and make writing to the EEPROM possible.

The present invention thus offers the effect of achieving an electronic apparatus that can be produced efficiently, while making provisions to greatly reduce the risk of the data stored in the EEPROM being altered in the field.

The invention described in one embodiment concerns an electronic apparatus comprising a board having a separable region, the board being mounted with a central processing unit, an electrically alterable nonvolatile storage device, a connector, a relaying device for connecting at least one terminal of the connector to at least one terminal of the central processing unit, and a detection device for detecting whether the region is separated or not, wherein when the region is not separated yet, data can be written to the storage device by connecting an external apparatus to the connector and directly controlling an internal logic circuit of the central processing unit, and when the region is separated, the relaying device, based on an output signal from the detection device, disconnects at least one connecting line connecting the terminal of the connector to the terminal of the central processing unit so that data cannot be written to the storage device by directly controlling the internal circuit of the central processing unit.

According to the electronic apparatus of the present invention, data (including program, etc.) can be written to the EEPROM efficiently by directly controlling the internal logic circuit of the CPU through the external apparatus (for example, JTAG debugger) and, by thereafter separating the region, the data stored in the EEPROM can be prevented from being altered.

According to the present invention, when producing the electronic apparatus at the factory, data (including program, etc.) can be written to the EEPROM efficiently and detection of a faulty part, etc. can also be carried out quickly and accurately by directly controlling the internal circuit of the CPU (for example, J-CPU) through the external apparatus such as a JTAG debugger. After completing the data write to the EEPROM, the region is separated so that a third party cannot illegally alter the data of the internal EEPROM in the field by connecting an external apparatus such as a JTAG debugger to the electronic apparatus.

Even if the third party knows that the above region of the board has been separated, it is extremely difficult to actually fix the board and make writing to the EEPROM possible.

The present invention thus offers the effect of achieving an electronic apparatus that can be produced efficiently, while making provisions to greatly reduce the risk of the data stored in the EEPROM being altered in the field.

The invention described in one embodiment concerns an electronic apparatus comprising a board having a separable region, the board being mounted with a central processing unit, an electrically alterable nonvolatile storage device, a connector, a relaying device for connecting at least one terminal of the connector to at least one terminal of the central processing unit, a scrambling device, and a detection device for detecting whether the region is separated or not, wherein: when the region is not separated yet, data read out of the storage device can be descrambled by the scrambling device and the descrambled data can be transferred to the central processing unit, and by connecting an external apparatus to the connector and directly controlling an internal logic circuit of the central processing unit, the central processing unit can be caused to output data to the scrambling device and the scrambling device can scramble the output data of the central processing unit and write the scrambled data to the storage device; and when the region is separated, data read out of the storage device can be descrambled by the scrambling device and the descrambled data can be transferred to the central processing unit, but the scrambling device cannot write data to the storage device based on an output signal of the detection device.

According to the electronic apparatus of the present invention, data (including program, etc.) can be written to the EEPROM efficiently by directly controlling the internal logic circuit of the CPU through the external apparatus (for example, JTAG debugger) and, by thereafter separating the region, the data stored in the EEPROM can be prevented from being altered.

According to the present invention, when producing the electronic apparatus at the factory, data (including program, etc.) can be written to the EEPROM efficiently and detection of a faulty part, etc. can also be carried out quickly and accurately by directly controlling the internal circuit of the CPU (for example, J-CPU) through the external apparatus such as a JTAG debugger. After completing the data write to the EEPROM, the region is separated so that a third party cannot illegally alter the data of the internal EEPROM in the field by connecting an external apparatus such as a JTAG debugger to the electronic apparatus.

Even if the third party knows that the above region of the board has been separated, it is extremely difficult to actually fix the board and make writing to the EEPROM possible.

The present invention thus offers the effect of achieving an electronic apparatus that can be produced efficiently, while making provisions to greatly reduce the risk of the data stored in the EEPROM being altered in the field.

The invention described in one embodiment concerns an electronic apparatus comprising a board having a separable region, the board being mounted with a central processing unit, an electrically alterable nonvolatile storage device, a connector, a scrambling device, and a detection device for detecting whether the region is separated or not, wherein: when the region is not separated yet, data read out of the storage device can be descrambled with a first scrambling pattern by the scrambling device and the descrambled data can be transferred to the central processing unit, and by connecting an external apparatus to the connector and directly controlling an internal logic circuit of the central processing unit, the central processing unit can be caused to output data to the scrambling device and the scrambling device can scramble the output data of the central processing unit with the first scrambling pattern and write the scrambled data to the storage device; and when the region is separated, data read out of the storage device can be descrambled with the first scrambling pattern, or with a second scrambling pattern different from the first scrambling pattern, by the scrambling device and the descrambled data can be transferred to the central processing unit, and by connecting the external apparatus to the connector and directly controlling the internal logic circuit of the central processing unit, the central processing unit can be caused to output data to the scrambling device and the scrambling device can scramble the output data of the central processing unit with the second scrambling pattern and write the scrambled data to the storage device.

According to the electronic apparatus of the present invention, data (including program, etc.) can be written to the EEPROM efficiently by directly controlling the internal logic circuit of the CPU through the external apparatus (for example, JTAG debugger) and, by thereafter separating the region, the data stored in the EEPROM can be prevented from being altered.

According to the present invention, when producing the electronic apparatus at the factory, data (including program, etc.) can be scrambled with the first scrambling pattern and written to the EEPROM efficiently and detection of a faulty part, etc. can also be carried out quickly and accurately by directly controlling the internal circuit of the CPU (for example, J-CPU) through the external apparatus such as a JTAG debugger. After completing the data write to the EEPROM, the region is separated so that a third party cannot illegally alter the data of the internal EEPROM in the field by connecting an external such as a JTAG debugger to the electronic apparatus.

Even if the third party knows that the above region of the board has been separated, it is extremely difficult to actually fix the board and make writing to the EEPROM possible.

Since the third party does not know the first scrambling pattern, the third party cannot remove the EEPROM from the board and write data directly to the EEPROM using a PROM writer or the like.

The present invention thus offers the effect of achieving an electronic apparatus that can be produced efficiently, while making provisions to greatly reduce the risk of the data stored in the EEPROM being altered in the field.

The invention described in claim 6 concerns an electronic apparatus comprising a board having a separable region, the board being mounted with a central processing unit, an electrically alterable nonvolatile storage device, a connector, a scrambling device, and a detection device for detecting whether the region is separated or not, wherein: when the region. is not separated yet, data read out of the storage device can be descrambled with a first scrambling pattern by the scrambling device and the descrambled data can be transferred to the central processing unit, and by connecting an external apparatus to the connector and directly controlling an internal logic circuit of the central processing unit, the central processing unit can be caused to output data to the scrambling device and the scrambling device can scramble the output data of the central processing unit with the first scrambling pattern and write the scrambled data to the storage device; and when the region is separated, data read out of the storage device can be descrambled with the first scrambling pattern, or with a second scrambling pattern different from the first scrambling pattern, by the scrambling device and the descrambled data can be transferred to the central processing unit, and by connecting the external apparatus to the connector and directly controlling the internal logic circuit of the central processing unit, the central processing unit can be caused to output data to the scrambling device and the scrambling device can scramble the output data of the central processing unit with the second scrambling pattern and write the scrambled data to the storage device.

According to the electronic apparatus of the present invention, data (including program, etc.) can be written to the EEPROM efficiently by directly controlling the internal logic circuit of the CPU through the external apparatus (for example, JTAG debugger) and, by thereafter separating the region, the data stored in the EEPROM can be prevented from being altered.

According to the present invention, when producing the electronic apparatus at the factory, data (including program, etc.) can be scrambled with the first scrambling pattern and written to the EEPROM efficiently and detection of a faulty part, etc. can also be carried out quickly and accurately by directly controlling the internal circuit of the CPU (for example, J-CPU) through the external apparatus such as a JTAG debugger.

Since the third party does not know the first scrambling pattern, the third party cannot remove the EEPROM from the board and write data directly to the EEPROM using a PROM writer or the like.

The phrase "when the region is separated, data read out of the storage device can be descrambled with the first scrambling pattern or the second scrambling pattern by the scrambling device" refers to the electronic apparatus that descrambles the data with the first scrambling pattern (but cannot descramble the data with the second scrambling pattern), the electronic apparatus that descrambles the data with the second scrambling pattern (but cannot descramble the data with the first scrambling pattern), and the electronic apparatus that descrambles the data with the first scrambling pattern or the second scrambling pattern, whichever pattern is selected by the customer.

The electronic apparatus of the invention in which, when the region is separated, the data read out of the storage device is descrambled by the scrambling device with the first scrambling pattern, has the following effect.

The electronic apparatus produced at the factory by writing data efficiently to the EEPROM is shipped after separating the region. The data scrambled with the first scrambling pattern and stored in the EEPROM is descrambled with the first scrambling pattern. Therefore, the electronic apparatus operates normally.

If a third party connects an external apparatus to the product in the field and tries to write data from the external apparatus into the storage device by directly controlling the internal logic circuit of the central processing unit, the scrambling device scrambles the output data of the central processing unit with the second scrambling pattern and writes the scrambled data to the storage device. Since the scrambling device reads data from the storage device and descrambles the data with the first scrambling pattern, the electronic apparatus does not operate with the illegally altered data.

Even if the third party knows that the above region of the board has been separated, it is extremely difficult to actually fix the board and make writing to the EEPROM possible.

Accordingly, the present invention offers the effect of achieving an electronic apparatus in which data stored in the EEPROM is difficult to alter.

The electronic apparatus of the invention in which, when the region is separated, the data read out of the storage device is descrambled by the scrambling device with the second scrambling pattern, has the following effect.

The electronic apparatus produced at the factory by writing data efficiently to the EEPROM is shipped without separating the region. The data scrambled with the first scrambling pattern and stored in the EEPROM is descrambled with the first scrambling pattern. Therefore, the electronic apparatus operates normally.

Even if a third party knows that the above region of the board has been separated, it is extremely difficult to actually fix the board and make writing to the EEPROM possible.

Since the third party does not know the first scrambling pattern, the third party cannot remove the EEPROM from the board and write data directly to the EEPROM using a PROM writer or the like.

Data in the EEPROM can be rewritten as many times as desired. Data scrambled with the first scrambling pattern is written to the EEPROM, and data read out of the EEPROM is descrambled with the first scrambling pattern. Accordingly, data such as a viewer's monthly viewing records, for example, can be recorded.

If the first scrambling pattern leaks out to a third party, and the EEPROM is illegally rewritten (assuming the case where the EEPROM is removed from the board and illegal data is written to the EEPROM by using a PROM writer or the like), then the region is separated. This causes the scrambling pattern to be changed from the first scrambling pattern to the second scrambling pattern. The electronic apparatus is functionally the same as before the region was separated, and at the same time, secrecy against a third party can be restored.

That is, data in the EEPROM can be altered as many times as desired. Data scrambled with the second scrambling pattern is written to the EEPROM, and data read out of the EEPROM is descrambled with the second scrambling pattern. Accordingly, data such as a viewer's monthly viewing records, for example, can be recorded.

Further, the third party does not know the second scrambling pattern.

Accordingly, the present invention offers the effect of achieving an electronic apparatus in which data stored in the EEPROM is difficult to alter.

The invention described in one embodiment concerns an electronic apparatus comprising a board having a first separable region and a second separable region, the board being mounted with a central processing unit, an electrically alterable nonvolatile storage device, a scrambling device, a detection device for detecting whether the first region is separated or not, and a detection device for detecting whether the second region is separated or not, wherein: when neither the first region nor the second region is separated yet, data read out of the storage device can be descrambled with a first scrambling pattern by the scrambling device and the descrambled data can be transferred to the central processing unit, and by connecting an external apparatus to the connector and directly controlling an internal logic circuit of the central processing unit, the central processing unit can be caused to output data to the scrambling device and the scrambling device can scramble the output data of the central processing unit with the first scrambling pattern and write the scrambled data to the storage device; when the first region is separated but the second region is not separated yet, data read out of the storage device can be descrambled with the first scrambling pattern by the scrambling device and the descrambled data can be transferred to the central processing unit, and by connecting the external apparatus to the connector and directly controlling the internal logic circuit of the central processing unit, the central processing unit can be caused to output data to the scrambling device and the scrambling device can scramble the output data of the central processing unit with a second scrambling pattern, a scrambling pattern different from the first scrambling pattern, and write the scrambled data to the storage device; and when the first region and the second region are both separated, data read out of the storage device can be descrambled with the second scrambling pattern by the scrambling device and the descrambled data can be transferred to the central processing unit, but data cannot be written to the storage device via the scrambling device by directly controlling the internal logic circuit of the central processing unit through the external apparatus connected to the connector.

The present invention thus offers the effect of achieving an electronic apparatus that can switch the scrambling pattern and descrambling pattern mode of the scrambling device according to whether the first region and/or the second region have been separated from the board, and that is capable of limiting the number of times that the EEPROM can be rewritten.

Since the third party does not know the first scrambling pattern, the third party cannot remove the EEPROM from the board and write data directly to the EEPROM using a PROM writer or the like.

Accordingly, the present invention offers the effect of achieving an electronic apparatus in which data stored in the EEPROM is difficult to alter.

The electronic apparatus produced at the factory by writing data efficiently to the EEPROM is shipped after separating the first region. The data scrambled with the first scrambling pattern and stored in the EEPROM is descrambled with the first scrambling pattern. Therefore, the electronic apparatus operates normally.

If a third party connects an external apparatus to the product in the field and tries to write data from the external apparatus into the storage device by directly controlling the internal logic circuit of the central processing unit, the scrambling device scrambles the output data of the central processing unit with the second scrambling pattern and writes the scrambled data to the storage device. Since the scrambling device reads data from the storage device and descrambles the data with the first scrambling pattern, the electronic apparatus does not operate with the illegally altered data.

Even if the third party knows that the above region of the board has been separated, it is extremely difficult to actually fix the board and make writing to the EEPROM possible.

When it becomes necessary to alter the data stored in the EEPROM, the external apparatus is connected to the connector and data is written to the EEPROM by directly controlling the internal logic circuit of the CPU. The data is scrambled with the second scrambling pattern. After that, the second region is separated from the board. Since the data stored in the EEPROM is then descrambled with the second scrambling pattern, the electronic apparatus operates normally.

Here, the fact that when the second region is separated, the data is descrambled with the second scrambling pattern is preferably kept secret.

Thus, according to the electronic apparatus of the present invention, data can be written to the EEPROM twice by directly controlling the internal logic circuit of the CPU through the external apparatus.

The invention described in one embodiment concerns the electronic apparatus described in any one of certain other embodiments, wherein the central processing unit is an IEEE 1149 standard compliant device.

According to the IEEE 1149 standard compliant device, the internal logic circuit of the CPU can be controlled directly by connecting the external apparatus to the TAP.

The present invention thus offers the effect of achieving an electronic apparatus that can be produced efficiently by using circuitry compliant with the IEEE 1149 standard, while making provisions to greatly reduce the risk of the data stored in the EEPROM being altered in the field.

The novel features of the invention will be hereinafter fully described and particularly pointed out in the appended claims, and the configuration and details of the invention, together with other objects and features thereof, will become better understood and appreciated by reference to the following detailed description when considered in conjunction with the accompanying drawings.

It will be appreciated that all or part of the drawings are purely diagrammatic for illustrative purposes and do not necessarily present faithful depictions of the actual relative sizes and positions of the illustrated elements.

BEST MODE FOR CARRYING OUT THE INVENTION

Embodiments illustrating the best mode for carrying out the invention will be described below with reference to the accompanying drawings.

EMBODIMENT 1

A first embodiment of the present invention will be described below with reference to FIG. 1.

Figure 1:
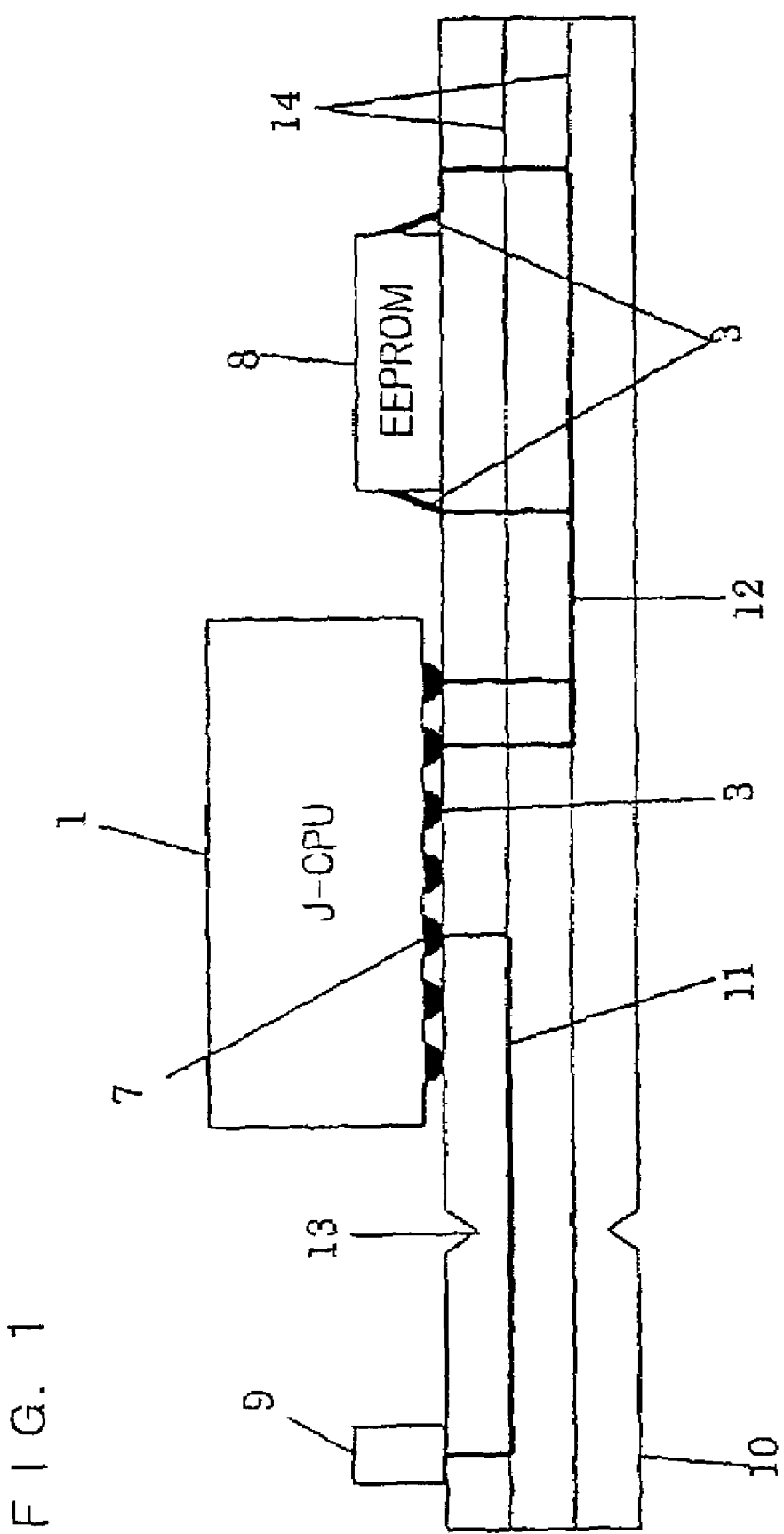
FIG. 1 is a diagram showing the configuration of an electronic apparatus, including a CPU and other components, according to a first embodiment of the present invention.

FIG. 1 shows a block including a J-CPU 1 and an EEPROM in an electronic apparatus according to the first embodiment. The use, kind, etc. of the electronic apparatus are not specifically limited, but the electronic apparatus of the first embodiment is applied to a satellite broadcast receiver.

The substantially same devices, components, etc. as those shown in the description of the prior art are L1 designated by the same reference numerals.

Figure 8:
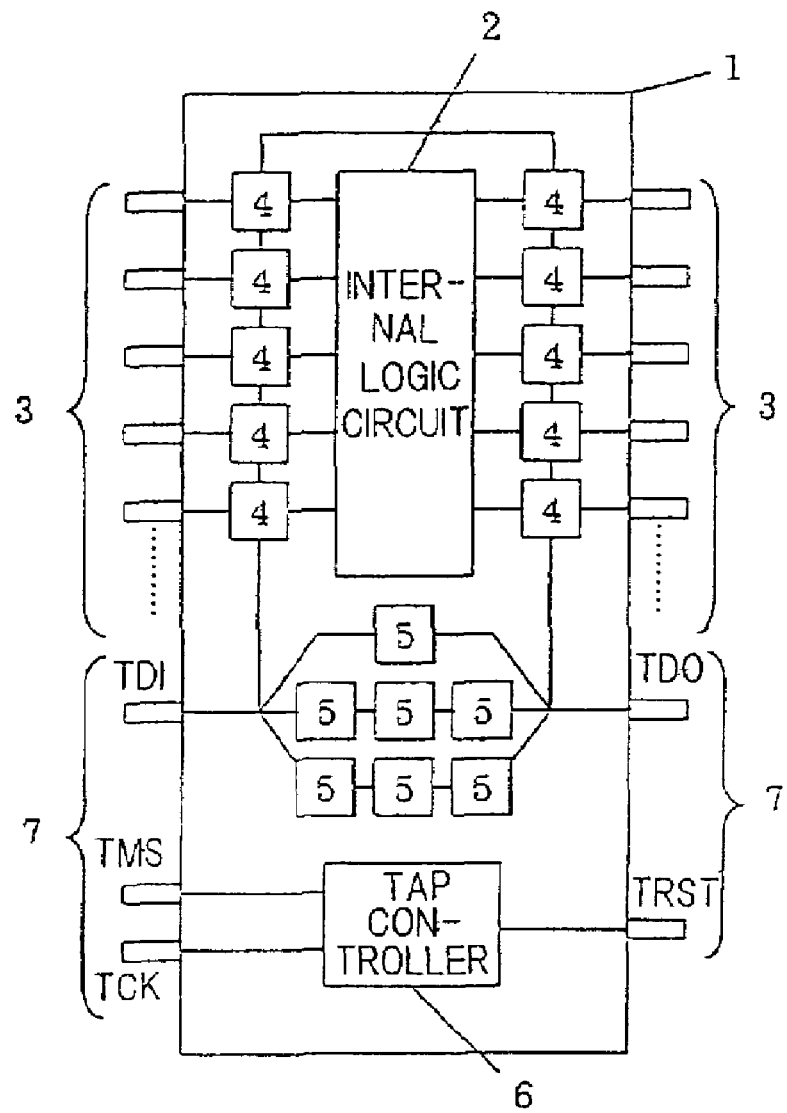
FIG. 8 is a diagram showing the internal configuration of the JTAG standard compliant element.

In FIG. 1, reference numeral 1 designates the CPU (J-CPU) having the same JTAG compliant device configuration as described with reference to FIG. 8 in the background art, 8 designates the EEPROM, an electrically alterable nonvolatile storage device for storing a program, 9 designates a JTAG connector for connecting a JTAG debugger (not shown), an external apparatus used to directly control the internal logic circuit of the J-CPU 1, 10 designates a multi-layer board on which many electronic components including the J-CPU 1 and EEPROM 8 are mounted and which consists of at least four layers, and 13 designates a V-shaped cut provided so that the board 10 can be separated easily.

In FIG. 1, the region to the left of the V-shaped cut, where the JTAG connector 9 is mounted, is the separable region. The J-CPU 1 has a plurality of terminals 3 and is soldered to the board 10. Of the plurality of terminals 3, reference numeral 7 designates terminals called the Test Access Port (TAP) specific to the JTAG standard compliant device, and comprises five terminals, TDI, TDO, TMS, TCK, and TRST.

However, the circuit configuration is not specifically limited to that shown in FIG. 1, and the terminals 7 may comprise four terminals, TDI, TDO, TMS, and TCK, since TRST is optional in the JTAG standard.

Reference numeral 11 designates five or four connecting lines connecting between the JTAG connector 9 and the TAP terminal 7. The connecting lines 11 are formed in an inner layer 14 of the board 10. Reference numeral 12 designates an address bus and a data bus connecting the J-CPU 1 to the EEPROM 8, etc. Other elements (for example, peripheral devices such as a serial port LSI) are also connected to the J-CPU 1 via the address bus and the data bus 12.

Generally, the JTAG connector 9 includes all the connecting lines (four or five lines) to the TAP, but in some cases, it may include a connecting line only for a signal essential to the operation of the JTAG circuit (in particular, a signal essential for writing data to the EEPROM), for example, a connecting line only to TDI or TCK.

When mounted (soldered) to the board 10, the chip of the J-CPU 1 is sealed in a ball grid array (BGA) package so that the terminals cannot be touched from outside. As shown in FIG. 1, the terminals of the BGA packaged device are all located within the contact surface between the BGA package and the board; as a result, when the device is mounted to the board (the device is in intimate contact with the board, leaving little gap between the device and the board), the terminals are not visible from outside. It is therefore not possible, for example, to solder wires to the terminals of the J-CPU 1 in FIG. 1 and input signals to the J-CPU 1 via the wires The electronic apparatus is produced in the following sequence.

(1) With the separable region not separated yet, the program is written to the EEPROM 8 mounted on the board. To write the program, the JTAG debugger is connected to the JTAG connector 9, and the program and a control instruction for the J-CPU 1 are sent from the JTAG debugger to the J-CPU 1 via the connecting lines 11. In accordance with the control instruction, the J-CPU 1 writes the sent program to the EEPROM 8 via the bus 12.

For example, by applying data to the TDI terminal and the clock signal to the TCK terminal, the data is transferred into the cells 4 (serial transfer through the shift register). Next, the data held in the cells 4 is outputted from the terminals 3 of the J-CPU 1 that control the EEPROM 8 (for example, a plurality of address terminals, a plurality of data terminals, a write strobe terminal and an enable terminal (or a chip select terminal) on the EEPROM 8). The output data is inputted into the EEPROM 8. By repeating this operation, the data can be written to the EEPROM 8.

This series of write operations can be achieved because the internal logic circuit of the J-CPU 1 can be directly controlled using the JTAG debugger.

(2) After writing the program, the separable region is cut off from the board 10 along the V-shaped cut 13. After separating the separable region, the completed electronic apparatus is shipped to the market.

After the separable region is separated, since the JTAG connector 9 connecting to the TAP 7 of the J-CPU 1 no longer exists, the JTAG debugger cannot be connected. This serves to prevent the program stored in the EEPROM from being illegally altered by a third party, because it is no longer possible to write a program to the EEPROM 8 by directly controlling the internal logic circuit of the J-CPU 1 through the JTAG debugger.

If the connecting lines 11 (for carrying JTAG signals) are formed in a surface layer of the board 10, the connecting lines 11 can be exposed by scraping off the protective layer covering the connecting lines 11. Then, by soldering wires directly to the exposed connecting lines 11 and connecting the other ends of the wires to the JTAG debugger, the program can be altered by directly controlling the internal logic circuit of the J-CPU 1 through the JTAG debugger.

However, in the case of the electronic apparatus of the first embodiment, since the connecting lines 11 are formed in an inner layer of the board 10, the JTAG debugger cannot be connected directly to the connecting lines 11. As a result, once the region is separated, the program cannot be altered.

All the five or four connecting lines 11 may be formed in an inner layer of the board 10, or only the TDI connecting line or the TCK connecting line, for example, may be formed in an inner layer of the board 10.

If the chip of the J-CPU 1 is sealed, for example, in a package such as the Quad Flat Package (QFP) which, when mounted to the board 10, allows the terminals 3 to be touched from outside, the JTAG debugger can be connected directly to the terminals 3; in this case, the program can be altered by directly controlling the internal logic circuit of the J-CPU 1 through the JTAG debugger.

In the first embodiment, since the chip of the J-CPU 1 is sealed in a BGA package, the program cannot be altered by connecting the JTAG debugger directly to the TAP 7.

In a modification of the first embodiment, the chip of the J-CPU 1 is sealed in a package (for example, a QFP) that allows touching from outside, but after mounting the J-CPU 1, at least the TAP 7 is sealed in a resin (for example, a resin difficult to remove is applied over the terminals of the TAP 7 and is cured). When the J-CPU 1 is mounted to the board, its terminals are sealed so that they cannot be touched from outside. With this method also, a similar effect to that described above can be obtained.

In this specification and in the appended claims, the phrase "the terminals, when mounted to the board, are sealed in such a manner that they cannot be touched from outside" refers not only to the case in which the chip of the semiconductor device is sealed in a BGA or like package, but also to the case in which after mounting the semiconductor device to the board, its terminals are sealed, for example, by covering them with a resin.

EMBODIMENT 2

A second embodiment of the present invention will be described below with reference to FIGS. 2 and 3.

Figure 2:
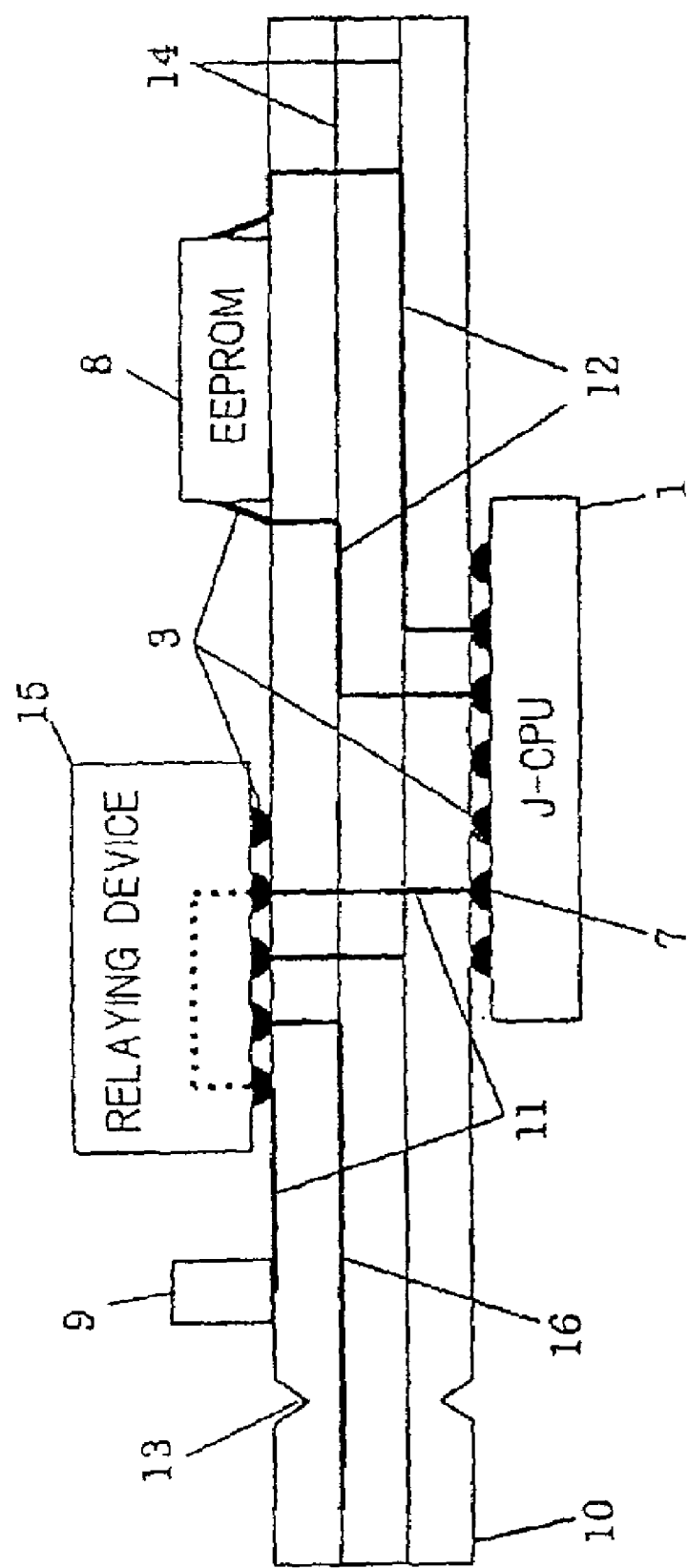
FIG. 2 is a diagram showing the configuration of an electronic apparatus, including a CPU and other components, according to a second embodiment of the present invention.

FIG. 2 shows a block including the J-CPU 1 and EEPROM 8 in the electronic apparatus of the second embodiment. The use, kind, etc. of the electronic apparatus are not specifically limited, but the electronic apparatus of the second embodiment is applied to a portable information terminal.

The substantially same devices, components, etc. as those shown in the description of the prior art or the first embodiment are designated by the same reference numerals, and specific descriptions of such devices or components will not be given here.

In FIG. 2, reference numeral 15 designates a first relaying device which relays signals between the JTAG connector 9 and the J-CPU 1, and reference numeral 16 designates a separation monitoring line which is brought out to the separable region to detect whether or not the separable region is separated from the board 10. A detection device for detecting whether the region is separated or not includes the separation monitoring line 16. The separation monitoring line 16 is formed in an inner layer of the board 10.

Figure 3:
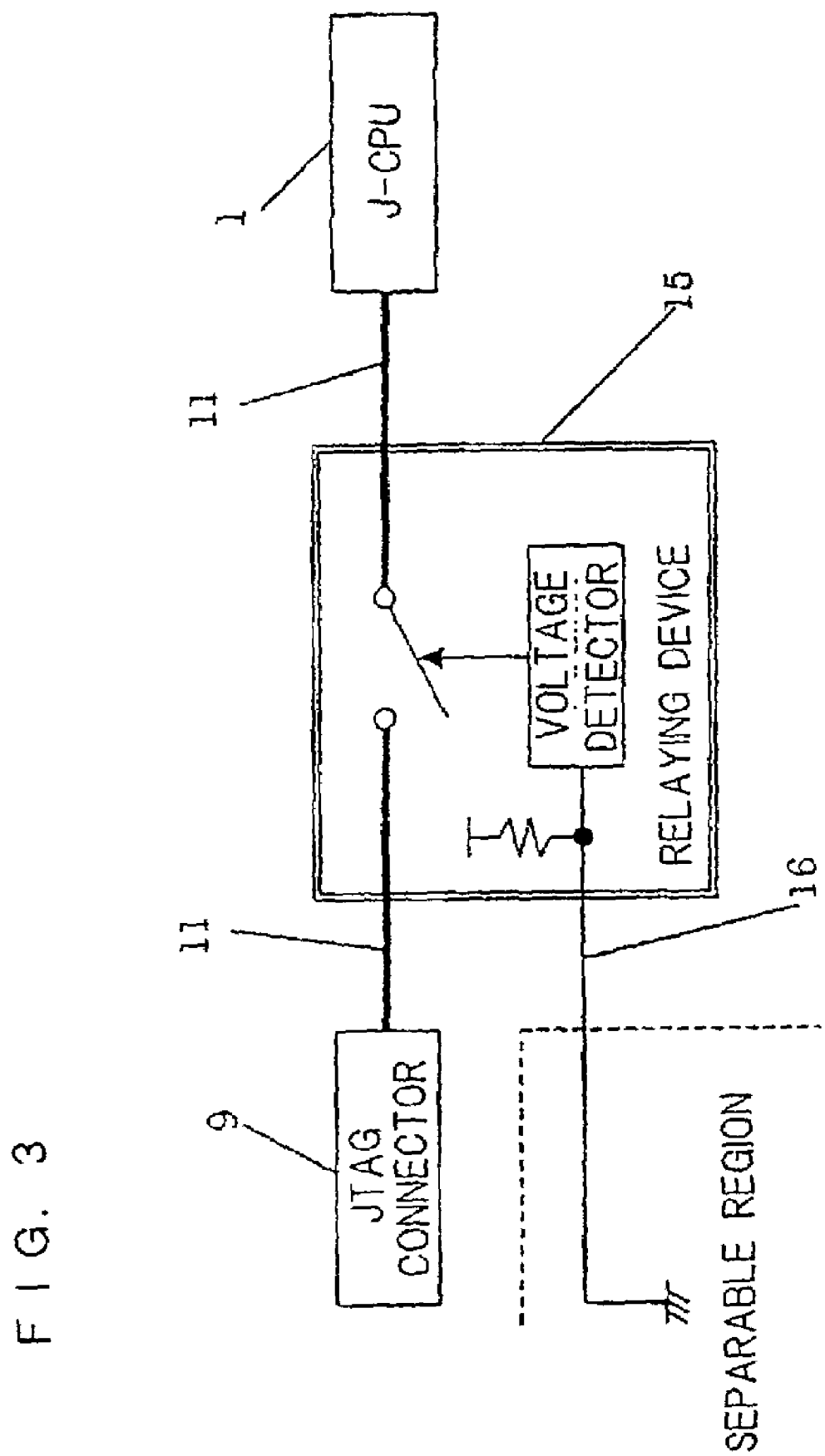
FIG. 3 is a diagram showing the configuration of a detection device for detecting whether a region is separated or not in the second, third, and fourth embodiments of the present invention.

Referring to FIG. 3, a description will be given of how the detection device including the separation monitoring line 16 detects whether or not the separable region is separated from the board 10. One end of the separation monitoring line 16 is connected to ground in the separable region of the board 10, and the other end is connected to the relaying device 15 and, inside the relaying device 15, is connected to a voltage detector, and a power supply via a resistor. The detection device includes the separation monitoring line, the resistor, the voltage detector, etc.

When the separable region is not separated yet, the voltage on the separation monitoring line 16 is equal to ground (0 V), and after the region is separated, the voltage is equal to the supply voltage (for example, +5 V). The voltage detector in there laying device 15 detects this voltage on the separation monitoring line 16.

When the voltage detector detects that the voltage on the separation monitoring line 16 is 0 V, the relaying device 15 connects the connecting lines 11 (the connecting lines connecting between the JTAG connector 9 and the TAP 7 of the J-CPU 1 and carrying JTAG signals therethrough). The external apparatus (JTAG debugger) is connected to the JTAG connector 9; the external apparatus can send JTAG signals to the J-CPU 1 and write data (program) to the EEPROM 8 by directly controlling the internal logic circuit of the J-CPU 1.

When the voltage on the separation monitoring line 16 is 5 V, the relaying device 15 disconnects the connecting lines 11. The external apparatus cannot send JTAG signals to the J-CPU 1. As a result, the data stored in the EEPROM cannot be altered.

The relaying device 15 may be configured to disconnect all the (four or five) connecting lines 11 or disconnect only the TDI line or the TCK line.

The electronic apparatus is produced in the following sequence.

(1) With the separable region not separated yet, the program is written to the EEPROM 8 mounted on the board. To write the program, the JTAG debugger is connected to the JTAG connector 9, and the program and a control instruction for the J-CPU 1 are sent from the JTAG debugger to the J-CPU 1 via the connecting lines 11 and relaying device 15. In accordance with the control instruction, the J-CPU 1 writes the program to the EEPROM 8 via the bus 12. This series of write operations can be achieved because the internal logic circuit of the J-CPU 1 can be directly controlled using the JTAG debugger.

(2) After writing the program, the separable region is cut off from the board 10 along the V-shaped cut 13. After separating the separable region, the completed electronic apparatus is shipped to the market.

When the separable region is separated, the relaying device 15 disconnects the connecting lines 11, so that programs cannot be written to the EEPROM 8 by directly controlling the internal logic circuit of the J-CPU 1 through the JTAG debugger. This serves to prevent the program stored in the EEPROM from being illegally altered by a third party.

If the separation monitoring line 16 is formed in a surface layer of the board 10, then after the separable region is separated from the board 10, the separation monitoring line 16 can be exposed by scraping off the protective layer covering the separation monitoring line 16. In this condition, if an illegal modification is made by soldering a wire directly to the exposed separation monitoring line 16 and connecting the other end of the wire to ground, the relaying device 15 connects the connecting lines 11. The program can then be altered by directly controlling the internal logic circuit 2 of the J-CPU 1 through the JTAG debugger.

However, in the case of the electronic apparatus of the first embodiment, since the separation monitoring line 16 is formed in an inner layer of the board 10, illegal modifications such as described above cannot be made. As a result, once the region is separated, the program cannot be altered.

Likewise, the connecting lines 11 between the relaying device 15 and the J-CPU 1 are also formed in the inner layers 14 of the board 10; as a result, the JTAG debugger cannot be connected directly to the connecting lines 11 connecting between the relaying device 15 and the J-CPU 1. This prevents the program from being altered.

Furthermore, since the J-CPU 1 and the relaying device 15 are each sealed as a chip in a BGA package, once these devices are mounted to the board, their terminals 3 cannot be touched from outside. As a result, the program cannot be altered by connecting the JTAG debugger directly to the JTAG signal terminals on the J-CPU 1 or the relaying device 15.

In another example of the embodiment, the J-CPU 1 and the relaying device 15 are each sealed as a chip in a package (for example, a QFP) that allows touching from outside, but after mounting the J-CPU 1 and there laying device 15, at least the JTAG signal terminals are sealed in a resin (for example, a resin difficult to remove is applied over the terminals of the TAP 7 and is cured). When the J-CPU 1 and the relaying device 15 are mounted to the board, their terminals are sealed so that they cannot be touched from outside. With this method also, a similar effect to that described above can be obtained.

EMBODIMENT 3

A third embodiment of the present invention will be described below with reference to FIG. 4.

Figure 4:
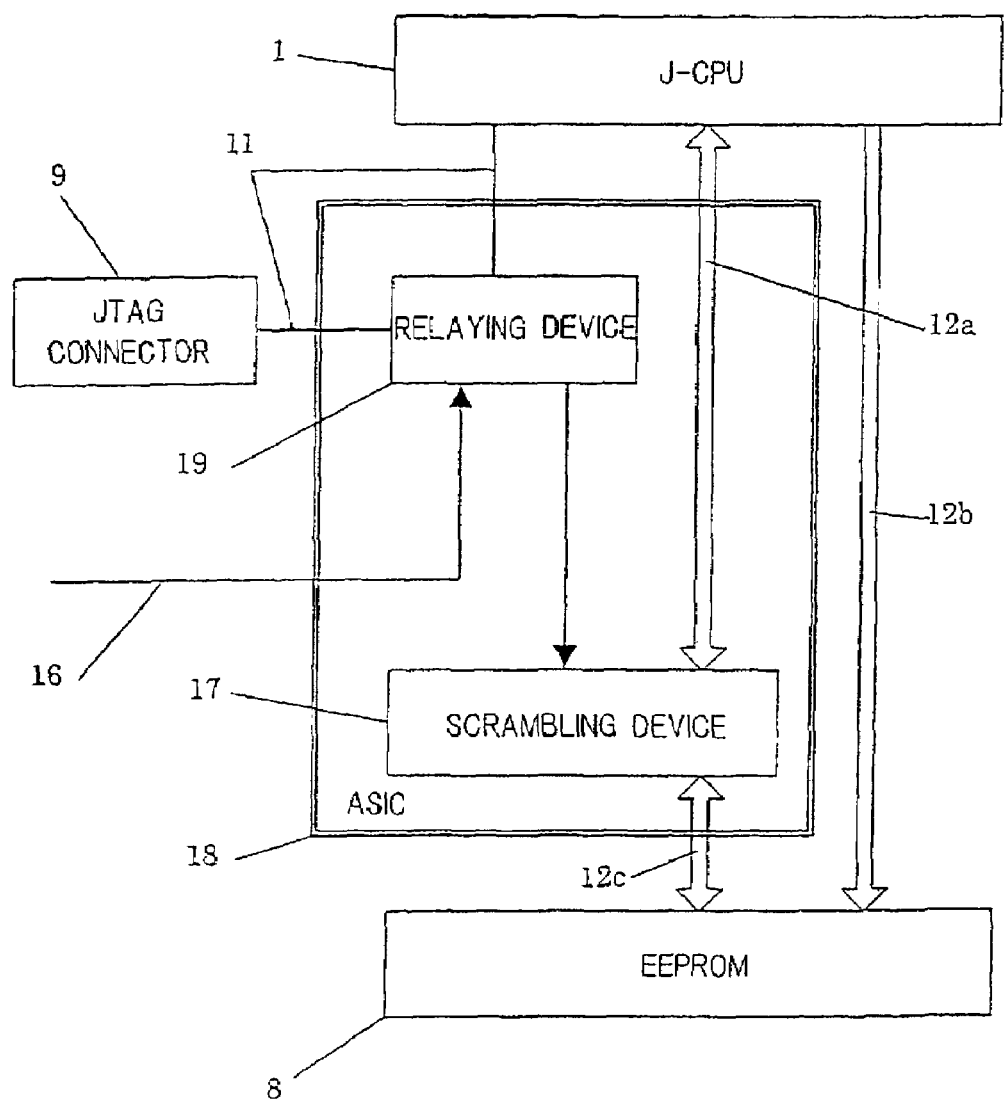
FIG. 4 is a diagram showing the configuration of an electronic apparatus, including a CPU and other components, according to the third embodiment of the present invention.

FIG. 4 shows a block including the J-CPU 1 and EEPROM in the electronic apparatus of the third embodiment. The use, kind, etc. of the electronic apparatus are not specifically limited, but the electronic apparatus of the third embodiment is applied to a copying machine.

The substantially same devices, components, etc. as those shown in the description of the prior art or the first or second embodiment are designated by the same reference numerals, and specific descriptions of such devices or components will be not be given here.

In FIG. 4, reference numerals 19 designates a second relaying device having a detection device and a relaying device. The detection device detects whether or not the separable region is separated from the board 10, and supplies the result of the detection to a scrambling device 17 as well as to the relaying device contained in the second relaying device 19. Based on the result of the detection from the detection device, the relaying device contained in the second relaying device 19 connects or disconnects the connecting lines 11 between the JTAG connector 9 and the J-CPU 1 (the connecting lines connecting between the JTAG connector 9 and the TAP of the J-CPU 1 and carrying JTAG signals therethrough).

Reference numerals 17 designates the first scrambling device which scrambles data being transferred from the J-CPU 1 to the EEPROM 8 and descrambles data being transferred from the EEPROM 8 to the J-CPU 1. Reference numeral 12*a* designates a data bus, 12*b* designates an address bus, and 12*c* designates a scrambled data bus, while reference numeral 18 designates a first semiconductor device which includes at least the second relaying device 19 and the scrambling device 17.

The second relaying device 19 is functionally the same as the relaying device 15 of the second embodiment, except that the result of the detection is supplied to the scrambling device 17.

The detection device is the same as that of the second embodiment shown in FIG. 3. Therefore, when the separable region is not separated yet, the separation monitoring line 16 is connected to ground, so that the separation monitoring line 16 is held at 0 V. When the separable region is separated, the voltage on the separation monitoring line 16 is the same as the supply voltage (for example, +5 V).

When the separable region is not yet separated from the board 10, the detection device detects from the separation monitoring line 16 that the separable region is not separated from the board 10, and sends a detection signal indicating that the region is not separated (hereinafter referred to as the first detection signal) to the scrambling device 17 as well as to the relaying device contained in the second relaying device 19. The relaying device contained in the second relaying device 19 connects the connecting lines 11 between the JTAG connector 9 and the J-CPU 1.

When the scrambling device receives the first detection signal at its input, the scrambling device 17 inputs the data outputted from the J-CPU 1, scrambles the input data with a secret scrambling pattern, and outputs the scrambled data. The scrambled data is written to the EEPROM. Further, regardless of whether the detection device is outputting the first detection signal or a detection signal indicating that the region is separated (hereinafter referred to as the second detection signal), the scrambling device 17 inputs the data read out of the EEPROM 8, descrambles the input data with the secret scrambling pattern, and transfers the descrambled data to the J-CPU 1.

When the separable region is separated from the board 10, the detection device sends the second detection signal to the scrambling device 17.

When the scrambling device 17 receives the second detection signal at its input, the scrambling device 17 does not perform data writing to the EEPROM 8. More specifically, a data write to the EEPROM 8 is inhibited, for example, by the scrambling device 17 disconnecting all the connecting lines between the J-CPU 1 and the EEPROM 8, or by disconnecting the write strobe signal transferred from the J-CPU 1 to the EEPROM 8 or disabling the enable terminal (or the chip select terminal) on the EEPROM 8.

The electronic apparatus is produced in the following sequence.

(1) With the separable region not separated yet, the program is written to the EEPROM 8 mounted on the board. To write the program, the JTAG debugger is connected to the JTAG connector 9, and the program and a control instruction for the J-CPU 1 are sent from the JTAG debugger to the J-CPU 1 via the connecting lines 11 and second relaying device 19. In accordance with the control instruction, the J-CPU 1 transfers the sent program to the scrambling device 17 via the buses 12*a* and 12*b*. The scrambling device 17 scrambles the program. The scrambled program is written to the EEPROM 8. This series of write operations can be achieved because the internal logic circuit of the J-CPU 1 can be directly controlled using the JTAG debugger.

(2) After writing the program, the separable region is cut off from the board along the V-shaped cut. After separating the separable region, the completed electronic apparatus is shipped to the market.

When the separable region is separated, the relaying device 19 disconnects the connecting lines 11 and also, the scrambling device 17 does not write data to the EEPROM 8; as a result, programs cannot be written to the EEPROM 8 by directly controlling the internal logic circuit of the J-CPU 1 through the JTAG debugger (in this case, only the connecting lines 11 may be disconnected or the writing to the EEPROM 8 may be inhibited). This serves to prevent the program stored in the EEPROM from being illegally altered by a third party.

In the third embodiment, the relaying device 19 and the scrambling device 17 are integrated into the semiconductor device 18 together with other circuits essential to the operation of the electronic apparatus. If the semiconductor device 18 is removed from the board 10, and if the terminals of the JTAG connector 9 are connected directly to the TAP of the JP-CPU 1 by wires and also the data bus 12a between the J-CPU 1 and the EEPROM 8 are connected directly by wires while bypassing the relaying device 19 and the scrambling device 17, it may be possible to alter the program in the EEPROM by using the JTAG debugger, but in that case, the electronic apparatus will not operate because it lacks with other circuits essential to the operation of the electronic apparatus by removing the semiconductor device 18.

Those other circuits essential to the operation are not specifically limited, and whether they are essential or not are determined depending on the internal configuration of the actual apparatus; examples are a RAM, an expansion input/output terminal, a serial input/output device, etc.

There is also the possibility that an illegal modification may be made by removing the EEPROM 8 from the board, altering the program in the EEPROM 8 by using a PROM writer or the like, and remounting the EEPROM 8 with altered program to the board. However, since the third party does not know the scrambling pattern of the scrambling device 17, the third party cannot write the program scrambled with the secret scrambling pattern to the EEPROM 8. As a result, if an illegal modification is made by writing non-scrambled data, etc. to the EEPROM, the electronic apparatus will not operate.

Furthermore, since the J-CPU 1 and the semiconductor device 18 are each sealed as a chip in a BGA package, once these devices are mounted to the board, their terminals cannot be touched from outside. As a result, the program cannot be altered by connecting the JTAG debugger directly to the JTAG signal terminals on the J-CPU 1 or the semiconductor device 18.

In another example of the embodiment, the J-CPU 1 and the semiconductor device 18 are each sealed as a chip in a package (for example, a QFP) that allows touching from outside, but after mounting the J-CPU 1 and the semiconductor device 18, at least the terminals for the JTAG signals and the terminal for the write strobe signal transferred from the J-CPU 1 to the EEPROM 8 are sealed in a resin (for example, a resin difficult to remove is applied over the terminals and is cured). When the J-CPU 1 and the semiconductor device 18 are mounted to the board, their terminals are sealed so that they cannot be touched from outside. With this method also, a similar effect to that described above can be obtained.

If the separation monitoring line 16 is formed in a surface layer of the board 10, then after the separable region is separated from the board 10, the separation monitoring line 16 can be exposed by scraping off the protective layer covering the separation monitoring line 16. In this condition, if an illegal modification is made by soldering a wire directly to the exposed separation monitoring line 16 and connecting the other end of the wire to ground, the detection device in the second relaying device 19 outputs the first detection signal. Then, the program can be altered by directly controlling the internal logic circuit 2 of the J-CPU 1 through the JTAG debugger.

However, in the case of the electronic apparatus of the third embodiment, since the separation monitoring line 16 is formed in an inner layer of the board 10, illegal modifications such as described above cannot be made. As a result, once the region is separated, the program cannot be altered.

Likewise, the connecting lines 11 between the second relaying device 19 and the J-CPU 1 are also formed in the inner layers 14 of the board 10; as a result, the JTAG debugger cannot be connected directly to the connecting lines 11 connecting between the second relaying device 19 and the J-CPU 1.

This prevents the program from being altered.

EMBODIMENT 4

A fourth embodiment of the present invention will be described below with reference to FIG. 5.

Figure 5:
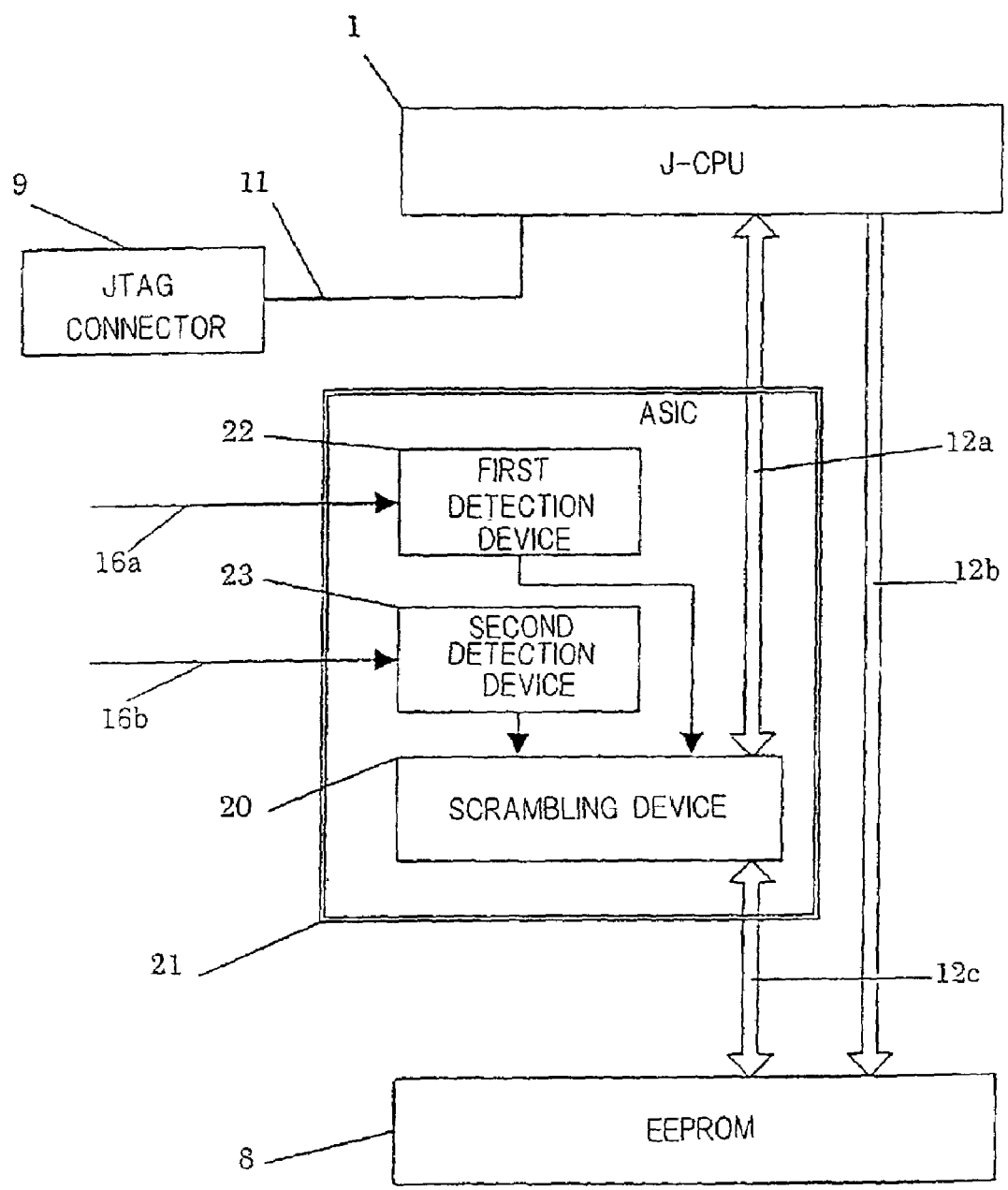
FIG. 5 is a diagram showing the configuration of an electronic apparatus, including a CPU and other components, according to the fourth embodiment of the present invention.
Figure 6:
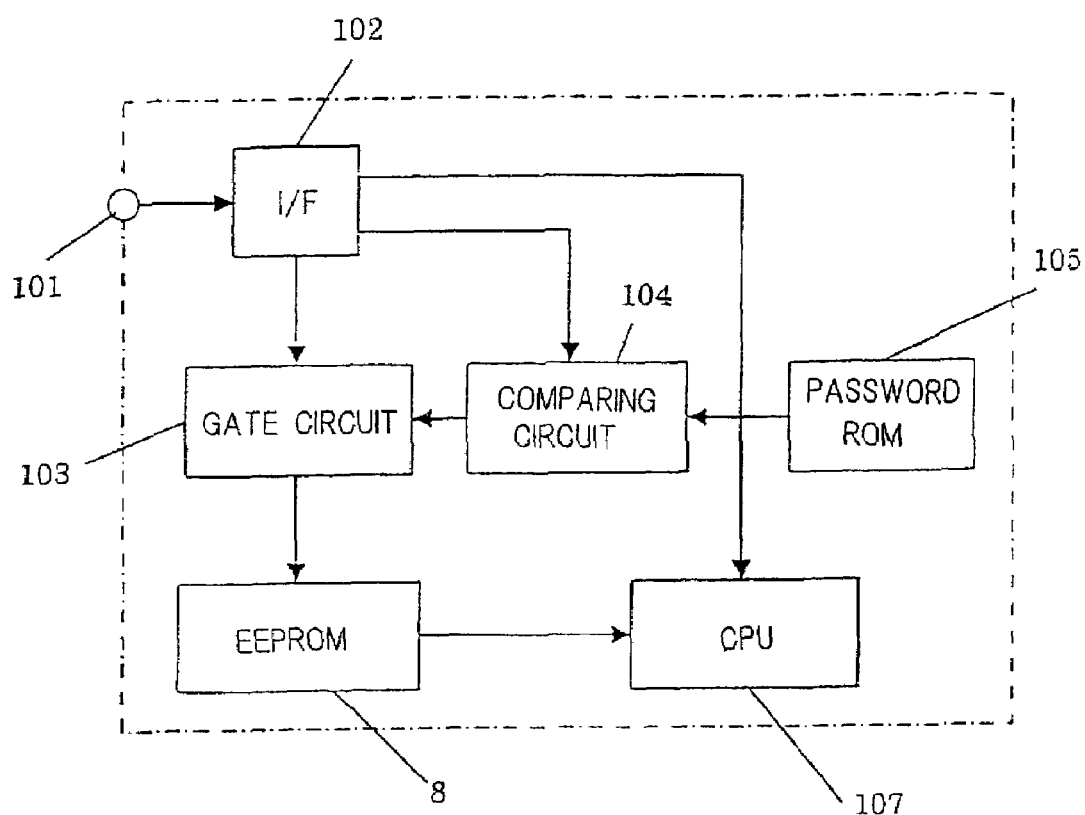
FIG. 6 is a diagram showing the configuration of an electronic apparatus, including a CPU and other components, according to the prior art.
Figure 7:
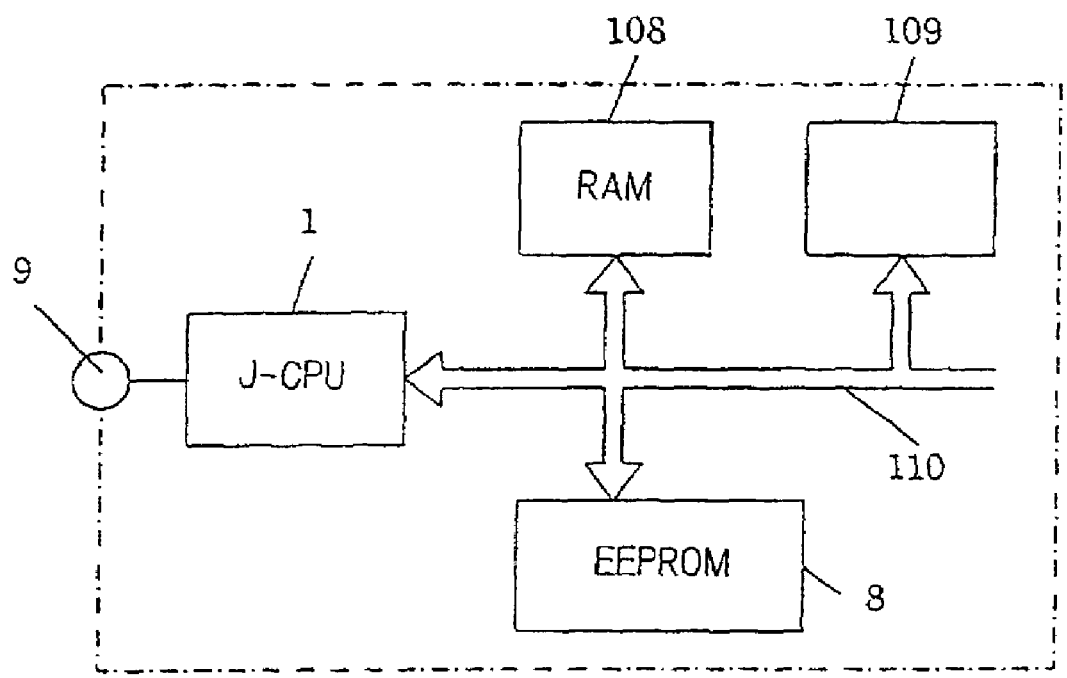
FIG. 7 is a block diagram showing a CPU and peripheral components in an electronic apparatus having a JTAG standard compliant CPU.

FIG. 5 shows a block including the J-CPU 1 and EEPROM in the electronic apparatus of the fourth embodiment. The use, kind, etc. of the electronic apparatus are not specifically limited, but the electronic apparatus of the fourth embodiment is applied to a set top box.

The substantially same devices, components, etc. as those shown in the description of the prior art or the first, second, or third embodiment are designated by the same reference numerals, and specific descriptions of such devices or components will be not be given here.

In FIG. 5, the board 10 has a first separable region and a second separable region. Reference numerals 16a and 16b designate monitoring lines used to detect whether or not the first separable region and the second separable region, respectively, are separated from the board 10. Like the monitoring line in FIG. 3 (the second embodiment), the monitoring line 16a is connected to ground in the first separable region of the board 10, while the monitoring line 16b is connected to ground in the second separable region of the board 10.

Reference numeral 22 designates a first detection device for detecting from the separation monitoring line 16a whether or not the first separable region is separated from the board 10, and reference numeral 23 designates a second detection device for detecting from the separation monitoring line 16b whether or not the second separable region is separated from the board 10. The first detection device and the second detection device are similar in configuration to that shown in FIG. 3 (the second embodiment), each including a resistor connected between the first or second monitoring line and the power supply (+5 V) and a voltage detector.

Reference numeral 20 designates a second scrambling device having two scrambling patterns and two descrambling patterns. Reference numeral 21 designates a second semiconductor device which includes at least the first detection device 22, the second detection device 23, and the second scrambling device 20.

A description will be given of the case where the first and the second separable regions are not separated yet.

The first detection device 22 and the second detection device 23 detect that the respective separation monitoring lines 16a and 16b are connected to ground, and send the respective detection results to the second scrambling device 20. The second scrambling device 20 sets the scrambling pattern to the first scrambling pattern and the descrambling pattern to the first descrambling pattern.

When writing a program to the EEPROM 8 by connecting the external apparatus (for example, JTAG debugger) to the JTAG connector 9 and by directly driving the internal logic circuit of the J-CPU 1 through the external apparatus, the scrambling device 20 inputs the data outputted from the J-CPU 1, scrambles the input data with the first scrambling pattern, and writes the scrambled data to the EEPROM 8.

The scrambling device 20 inputs the data read out of the EEPROM 8, descrambles the input data with the first scrambling pattern, and transfers the descrambled data to the J-CPU 1.

Next, a description will be given of the case where the first separable region is separated but the second separable region is not separated yet.

The first detection device 22 detects that the voltage on the separation monitoring line 16a is +5 V (indicating that the first region is separated), while the second detection device 23 detects that the voltage on the separation monitoring line 16b is 0 V (indicating that the second region is not separated), and the respective detection results are sent to the second scrambling device 20. The second scrambling device 20 sets the scrambling pattern to the second scrambling pattern and the descrambling pattern to the first descrambling pattern.

When writing a program to the EEPROM 8 by connecting the external apparatus (for example, JTAG debugger) to the JTAG connector 9 and by directly driving the internal logic circuit of the J-CPU 1 through the external apparatus, the scrambling device 20 inputs the data outputted from the J-CPU 1, scrambles the input data with the second scrambling pattern, and writes the scrambled data to the EEPROM 8.

The scrambling device 20 inputs the data read out of the EEPROM 8, descrambles the input data with the first scrambling pattern, and transfers the descrambled data to the J-CPU 1.

Next, a description will be given of the case where the first and second separable regions are both separated.

The first detection device 22 and the second detection device 23 detect that the voltages on the respective separation monitoring lines 16a and 16b are both +5 V (indicating that both regions are separated). The respective detection results are sent to the second scrambling device 20. The second scrambling device 20 disconnects the path through which the write data and the write strobe signal are sent to the EEPROM 8, and sets the descrambling pattern to the second descrambling pattern.

Accordingly, even if the external apparatus (for example, JTAG debugger) is connected to the JTAG connector 9, and the internal logic circuit of the J-CPU 1 is directly driven from the external apparatus, data cannot be written to the EEPROM 8.

The scrambling device 20 inputs the data read out of the EEPROM 8, descrambles the input data with the second scrambling pattern, and transfers the descrambled data to the J-CPU 1.

More specifically, when the first and second separable regions are not separated yet, the program to be written to the EEPROM 8, which has been transferred to the J-CPU 1 via the connecting lines 11 from the JTAG debugger connected to the JTAG connector 9, is transferred via the data bus 12a and inputted into the second scrambling device 20 where the program is scrambled with the first scrambling pattern, and the scrambled program is written to the EEPROM 8 via the data bus 12c. The data read out of the EEPROM 8 is transferred via the data bus 12c and inputted into the second scrambling device 20 where the data is descrambled in accordance with the first descrambling pattern, and the descrambled data is transferred to the J-CPU 1 via the data bus 12a. In this case, therefore, the program can be altered an unlimited number of times.

With only the first separable region separated, if a program rewrite is executed, data scrambled in accordance with the second scrambling pattern is written to the EEPROM 8; in this case, the data read out of the EEPROM 8 needs to be descrambled by the scrambling device 20 in accordance with the second descrambling pattern, and to achieve this, the second separable region must be separated. When the second separable region is separated, the second scrambling device 20 prohibits a write to the EEPROM 8, so that thereafter the data in the EEPROM 8 cannot be altered.

The electronic apparatus of the fourth embodiment can achieve three states: the state in which the program can be altered an unlimited number of times, the state in which the program can be altered only once, and the state in which alteration of the program is prohibited. This prevents illegal alterations of the program, while allowing the data in the EEPROM 8 in the electronic apparatus to be altered when necessary.

The electronic apparatus is produced in the following sequence.

(1) With the separable regions not separated yet, the program is written to the EEPROM 8 mounted on the board. To write the program, the JTAG debugger is connected to the JTAG connector 9, and the program and a control instruction for the J-CPU 1 are sent from the JTAG debugger to the J-CPU 1 via the connecting lines 11. In accordance with the control instruction, the J-CPU 1 transfers the sent program to the scrambling device 20 via the bus 12a. The scrambling device 20 scrambles the transferred program with the first scrambling pattern. The scrambled program is written to the EEPROM 8 via the bus 12c. This series of write operations can be achieved because the internal logic circuit of the J-CPU 1 can be directly controlled using the JTAG debugger.

(2) After writing the program, the first separable region is separated. After separating the separable region, the completed electronic apparatus is shipped to the market.

(3) If it becomes necessary to alter the program after the product is shipped to the market, data is written to the EEPROM at the service station in the same procedure as in (1), after which the second separable region is separated. After that, the electronic apparatus is sent back to the market.

Here, there is the possibility that a third party may connect a JTAG debugger to the JTAG connector 9 and write data from the JTAG debugger to the EEPROM 8 by directly controlling the internal logic circuit of the J-CPU 1 through the JTAG debugger. In this case, however, the scrambling device 20 scrambles the input data with the second scrambling pattern, and writes the scrambled data to the EEPROM 8. On the In the fourth embodiment, the second semiconductor device 21 includes the first detection device 22, second detection device 23, second scrambling device 20, and other circuits essential to the operation of the electronic apparatus. If the semiconductor device 21 is removed from the board 10, and if the data buses 12a and 12c between the J-CPU 1 and the EEPROM 8 are directly connected by wires while bypassing the scrambling device 20, then it may be possible to alter the program in the EEPROM by using the JTAG debugger, but in that case, the electronic apparatus will not operate because it lacks with other circuits essential to the operation of the electronic apparatus by removing the semiconductor device 21.

There is also the possibility that an illegal modification may be made by removing the EEPROM 8 from the board, altering the program in the EEPROM 8 by using a PROM writer or the like, and remounting the EEPROM 8 with altered program to the board. However, since the third party does not know the first scrambling pattern of the scrambling device 20, the third party cannot write the program scrambled with the first scrambling pattern to the EEPROM 8. As a result, if an illegal modification such as described above is made, the electronic apparatus will not operate.

If the separation monitoring line 16*a* or 16*b* is formed in a surface layer of the board 10, then after the separable region is separated from the board 10, the separation monitoring line 16*a* or 16*b* can be exposed by scraping off the protective layer covering the separation monitoring line 16*a* or 16*b*. If an illegal modification is made by soldering a wire directly to the exposed separation monitoring line 16*a* or 16*b* and connecting the other end of the wire to ground, the first detection device 22 or the second detection device 23 outputs a detection signal indicating that the first region or the second region is not separated. Then, the program stored in the EEPROM 8 can be altered by directly controlling the internal logic circuit 2 of the J-CPU 1 through the JTAG debugger.

However, in the case of the electronic apparatus of the fourth embodiment, since the separation monitoring lines 16*a* and 16*b* are formed in an inner layer of the board 10, illegal modifications such as described above cannot be made. As a result, after the first region is separated, it is difficult to alter the program, and after the first and second regions are both separated, the program cannot be altered.

This prevents the program from being altered.

Another embodiment having the configuration of FIG. 5 will be described.

When the first and second regions are not separated yet, the scrambling device 20 scrambles the output data of the J-CPU 1 with the first scrambling pattern, and transfers the scrambled data to the EEPROM 8. The scrambling device 20 descrambles the data read out of the EEPROM 8 with the first scrambling pattern, and transfers the descrambled data to the J-CPU 1.

When the first region is separated but the second region is not separated yet, the scrambling device 20 scrambles the output data of the J-CPU 1 with the second scrambling pattern, and transfers the scrambled data to the EEPROM 8. The scrambling device 20 descrambles the data read out of the EEPROM 8 with the second scrambling pattern, and transfers the descrambled data to the J-CPU 1.

When the first and second regions are both separated, the scrambling device 20 disconnects the path through which the write strobe signal from the J-CPU 1 is transferred. The scrambling device 20 descrambles the data read out of the EEPROM 8 with the second scrambling pattern, and transfers the descrambled data to the J-CPU 1.

According to the present invention, when producing the electronic apparatus at the factory, data (including program, etc.) can be written to the EEPROM efficiently and detection of a faulty part, etc. can also be carried out quickly and accurately by directly controlling the internal circuit of the CPU (for example, J-CPU) through the external apparatus such as a JTAG debugger. After completing the data write to the EEPROM, the region is separated so that a third party cannot illegally alter the data of the internal EEPROM in the field by connecting an external apparatus such as a JTAG debugger to the electronic apparatus.

According to the present invention, there is offered the advantageous effect of achieving a production method that can produce an electronic apparatus efficiently, while making provisions to greatly reduce the risk of the data stored in the EEPROM in the completed electronic apparatus being altered in the field.

In the present invention, provisions are made so that a third party cannot illegally alter the data of the internal EEPROM in the field by such methods as soldering wires directly to the terminals of the CPU, etc. or to the connecting lines, etc. on the board and connecting the other ends of the wires to the terminals of the external apparatus such as a JTAG debugger.

According to the present invention, there is offered the advantageous effect of achieving a production method for an electronic apparatus wherein the risk of the data stored in the EEPROM in the completed electronic apparatus being altered in the field is further reduced.

Further, in the electronic apparatus production method of the present invention, scrambled data is written to the EEPROM, and the scrambling pattern used is not known to a third party; as a result, the third party cannot remove the EEPROM and rewrite the stored data using a PROM writer or the like.

According to the present invention, there is offered the advantageous effect of achieving a production method that can produce an electronic apparatus efficiently, while making provisions to greatly reduce the risk of the data stored in the EEPROM in the completed electronic apparatus being altered in the field.

According to the present invention, there is also offered the advantageous effect of being able to achieve an electronic apparatus wherein the scrambling pattern for the data to be written to the EEPROM can be changed by removing a specific region from the board. Once the region is separated, since the scrambling pattern that the scrambling device uses to descramble data is different from the scrambling pattern it uses to scramble the data, it is extremely difficult for a third party to illegally write data. Here, by separating a secret second region, it becomes possible to alter the data stored in the EEPROM.

According to the present invention, there is offered the advantageous effect of achieving a production method that can produce an electronic apparatus efficiently, wherein provisions are made to greatly reduce the risk of the data stored in the EEPROM in the completed electronic apparatus being altered in the field, and wherein the data stored in the EEPROM in the completed electronic apparatus can be altered at a later time.

According to the present invention, there is offered the advantageous effect of achieving an efficient production method for an electronic apparatus by using circuitry compliant with the IEEE 1149 standard, while making provisions to greatly reduce the risk of the data stored in the EEPROM in the completed electronic apparatus being altered in the field.

According to the electronic apparatus of the present invention, data (including program, etc.) can be written to the EEPROM efficiently by directly controlling the internal logic circuit of the CPU through the external apparatus (for example, JTAG debugger) and, by thereafter separating the region mounted, the data stored in the EEPROM can be prevented from being altered.

According to the present invention, when producing the electronic apparatus at the factory, data (including program, etc.) can be written to the EEPROM efficiently and detection of a faulty part, etc. can also be carried out quickly and accurately by directly controlling the internal circuit of the CPU (for example, J-CPU) through the external apparatus such as a JTAG debugger. After completing the data write to the EEPROM, the region is separated so that a third party cannot illegally alter the data of the internal EEPROM in the field by connecting an external apparatus such as a JTAG debugger to the electronic apparatus.

According to the present invention, there is offered the advantageous effect of achieving an electronic apparatus that can be produced efficiently, while making provisions to greatly reduce the risk of the data stored in the EEPROM being altered in the field.

Further, in the present invention, scrambled data is written to the EEPROM, and the scrambling pattern used is not known to a third party; as a result, the third party cannot remove the EEPROM and rewrite the stored data using a PROM writer or the like.

According to the present invention, there is offered the advantageous effect of achieving an electronic apparatus that can be produced efficiently, while making provisions to greatly reduce the risk of the data stored in the EEPROM being altered in the field.

According to the present invention, there is also offered the advantageous effect of achieving an electronic apparatus wherein the scrambling pattern for the data to be written to the EEPROM can be changed by removing a specific region from the board.

In the electronic apparatus in which once the region is separated, the scrambling pattern that the scrambling device uses to descramble data is different from the scrambling pattern it uses to scramble the data, it is extremely difficult for a third party to illegally write data. Here, by separating a secret second region, it becomes possible to alter the data stored in the EEPROM.

According to the present invention, there is offered the advantageous effect of achieving an electronic apparatus that can be produced efficiently, wherein provisions are made to greatly reduce the risk of the data stored in the EEPROM being altered in the field, and wherein the data stored in the EEPROM in the completed electronic apparatus can be altered at a later time.

The present invention also achieves an electronic apparatus wherein the scrambling pattern for the data to be written to the EEPROM can be changed by removing a specific region from the board, and wherein the data in the EEPROM can be rewritten as many times as desired by using respective scrambling patterns.

The present invention achieves an electronic apparatus wherein provisions are made to make it difficult to illegally alter data, such as a viewer's monthly viewing records, that needs to be rewritten many times.

Since the third party does not know the first scrambling pattern, a third party cannot remove the EEPROM from the board and write data directly to the EEPROM using a PROM writer or the like.

Further, if it is judged that the data has been altered illegally, the scrambling pattern can be changed by removing the region from the board.

According to the present invention, there is offered the advantageous effect of achieving an electronic apparatus in which data stored in the EEPROM is difficult to alter.

According to the present invention, there is offered the advantageous effect of achieving an electronic apparatus that can switch the scrambling pattern and descrambling pattern mode of the scrambling device according to whether the first region and/or the second region have been separated from the board, and that is capable of limiting the number of times that the EEPROM can be rewritten (that is, the EEPROM can be rewritten only once).

According to the present invention, there is offered the advantageous effect of achieving an electronic apparatus that can be produced efficiently by using circuitry compliant with the IEEE 1149 standard, while making provisions to greatly reduce the risk of the data stored in the EEPROM being altered in the field.

Although the invention has been described in some detail dealing with the preferred embodiments, the configuration details of any of the preferred embodiments disclosed herein may be changed or modified, and any changes in the combination or order of elements thereof can be accomplished without departing from the spirit and scope of the invention as set forth in the appended claims.

INDUSTRIAL APPLICABILITY

The present invention can be applied to an electronic apparatus that is controlled by a central processing unit compliant with the IEEE std 1149.1-1990 Standard Test Access Port and Boundary-Scan Architecture and the like, and particularly suited for the prevention of illegal alteration of data stored in a storage device (data including an operating program for the central processing unit, cryptographic keys, customer identifiers (user ID codes), etc.).

The invention claimed is:

1. A production method for an electronic apparatus comprising a board having a separable region, said board being mounted with a central processing unit, an electrically alterable nonvolatile storage device, a connector, a scrambling device, and a detection device for detecting whether said region is separated or not, wherein:

when said region is not separated yet, data read out of said storage device can be descrambled with a first scrambling pattern by said scrambling device and the descrambled data can be transferred to said central processing unit, and by connecting an external apparatus to said connector and directly controlling an internal logic circuit of said central processing unit, said central processing unit can be caused to output data to said scrambling device and said scrambling device can scramble the output data of said central processing unit with said first scrambling pattern and write the scrambled data to said storage device; and when said region is separated, based on an output signal of said detection device, data read out of said storage device can be descrambled with said first scrambling pattern by said scrambling device and the descrambled data can be transferred to said central processing unit, and by connecting said external apparatus to said connector and directly controlling the internal logic circuit of said central processing unit, said central processing unit can be caused to output data to said scrambling device and said scrambling device can scramble the output data of said central processing unit with a second scrambling pattern and write the scrambled data to said storage device, said production method comprising:

a writing step in which by connecting said external apparatus to said connector and directly controlling the internal logic circuit of said central processing unit, said central processing unit is caused to output data to said scrambling device, and in which said scrambling device scrambles the output data of said central processing unit with the first scrambling pattern and writes the scrambled data to said storage device; and a separating step of separating said region after said writing step.

2. A production method for an electronic apparatus according to claim 1, wherein said scrambling device, said detection device, and other circuits essential to the operation of said electronic apparatus are contained in a single semiconductor device.

3. A production method for an electronic apparatus according to claim 2, wherein said semiconductor device is sealed in such a manner that, when mounted on said board, terminals of said semiconductor device cannot be touched from the outside.

4. A production method for an electronic apparatus according to claim 1, wherein said board is a multi-layer board consisting of at least four layers, and a line used to carry a detection signal indicating whether said region is separated or not is formed in an inner layer of said board.

5. A production method for an electronic apparatus according to claim 1, wherein said board is a multi-layer board consisting of at least four layers, and at least one connecting line connecting between said central processing unit and said relaying device is formed in an inner layer of said board.

6. An electronic apparatus comprising a board having a separable region, said board being mounted with a central processing unit, an electrically alterable nonvolatile storage device, a connector, a scrambling device, and a detection device for detecting whether said region is separated or not, wherein:

when said region is not separated yet, data read out of said storage device can be descrambled with a first scrambling pattern by said scrambling device and the descrambled data can be transferred to said central processing unit, and by connecting an external apparatus to said connector and directly controlling an internal logic circuit of said central processing unit, said central processing unit can be caused to output data to said scrambling device and said scrambling device can scramble the output data of said central processing unit with said first scrambling pattern and write the scrambled data to said storage device; and when said region is separated, data read out of said storage device can be descrambled with said first scrambling pattern or with a second scrambling pattern different from said first scrambling pattern by said scrambling device, and the descrambled data can be transferred to said central processing unit, and by connecting said external apparatus to said connector and directly controlling the internal logic circuit of said central processing unit, said central processing unit can be caused to output data to said scrambling device and said scrambling device can scramble the output data of said central processing unit with said second scrambling pattern and write the scrambled data to said storage device.

7. An electronic apparatus comprising a board having a first separable region and a second separable region, said board being mounted with a central processing unit, an electrically alterable nonvolatile storage device, a scrambling device, a detection device for detecting whether said first region is separated or not, and a detection device for detecting whether said second region is separated or not, wherein:

when neither said first region nor said second region is separated yet, data read out of said storage device can be descrambled with a first scrambling pattern by said scrambling device and the descrambled data can be transferred to said central processing unit, and by connecting an external apparatus to said connector and directly controlling an internal logic circuit of said central processing unit, said central processing unit can be caused to output data to said scrambling device and said scrambling device can scramble the output data of said central processing unit with said first scrambling pattern and write the scrambled data to said storage device;

when said first region is separated but said second region is not separated yet, data read out of said storage device can be descrambled with said first scrambling pattern by said scrambling device and the descrambled data can be transferred to said central processing unit, and by connecting said external apparatus to said connector and directly controlling the internal logic circuit of said central processing unit, said central processing unit can be caused to output data to said scrambling device and said scrambling device can scramble the output data of said central processing unit with a second scrambling pattern, a scrambling pattern different from said first scrambling pattern, and write the scrambled data to said storage device; and when said first region and said second region are both separated, data read out of said storage device can be descrambled with said second scrambling pattern by said scrambling device and the descrambled data can be transferred to said central processing unit, but data cannot be written to said storage device via said scrambling device by directly controlling the internal logic circuit of said central processing unit through said external apparatus connected to said connector.

* * * * *